United States Patent
Tanaka et al.

(10) Patent No.: US 9,288,663 B2
(45) Date of Patent: Mar. 15, 2016

(54) TERMINAL DEVICE, AND COMMUNICATION METHOD AND COMMUNICATION MODULE FOR THE SAME

(71) Applicant: Panasonic Intellectual Property Corporation of America, Torrance, CA (US)

(72) Inventors: Toshiaki Tanaka, Hyogo (JP); Masaru Yamaoka, Osaka (JP); Michihiro Matsumoto, Shiga (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 269 days.

(21) Appl. No.: 14/110,624

(22) PCT Filed: Feb. 8, 2013

(86) PCT No.: PCT/JP2013/000694
§ 371 (c)(1),
(2) Date: Oct. 8, 2013

(87) PCT Pub. No.: WO2013/121758
PCT Pub. Date: Aug. 22, 2013

(65) Prior Publication Data
US 2014/0066045 A1    Mar. 6, 2014

(30) Foreign Application Priority Data
Feb. 15, 2012  (JP) .................. 2012-031028

(51) Int. Cl.
*H04M 3/00* (2006.01)
*H04W 8/22* (2009.01)
(Continued)

(52) U.S. Cl.
CPC ................. *H04W 8/22* (2013.01); *G08C 17/02* (2013.01); *H04B 5/0056* (2013.01)

(58) Field of Classification Search
CPC . H04W 8/22; H04B 5/0056; H04L 29/06068; H04L 29/06; H04L 63/0281; G08C 17/02
USPC ............. 455/418, 419, 420, 426.1, 518, 509, 455/519, 450, 11.1, 445; 370/465, 466, 370/467; 709/204, 223, 230, 237; 726/12
See application file for complete search history.

(56) References Cited

U.S. PATENT DOCUMENTS 7,246,750 B2    7/2007  Cho
7,520,441 B2    4/2009  Cho
(Continued)

FOREIGN PATENT DOCUMENTS

JP    2005-85269    3/2005
JP    2006-109094   4/2006
(Continued)

OTHER PUBLICATIONS

International Search Report issued Mar. 19, 2013 in International Application No. PCT/JP2013/000694.

*Primary Examiner* — Mahendra Patel
(74) *Attorney, Agent, or Firm* — Wenderoth, Lind & Ponack, L.L.P.

(57) ABSTRACT

A terminal device includes: a terminal controller which interprets only one of command schemes of a wireless communication unit and a near-field communication unit, and controls a function of the terminal device; and a control unit which controls communications between the wireless communication unit and the terminal controller and between the near-field communication unit and the terminal controller. The control unit includes: an identification number addition unit which adds an identification number to a command from the near-field communication unit or the wireless communication unit; and a command converting unit which converts a command of the other command scheme into a command of one command scheme, using a command conversion table.

14 Claims, 20 Drawing Sheets

(51) Int. Cl.
  *G08C 17/02*  (2006.01)
  *H04B 5/00*  (2006.01)

(56) References Cited

U.S. PATENT DOCUMENTS

| | | |
|---|---|---|
| 7,650,144 B2 | 1/2010 | Nakamura et al. |
| 8,064,829 B2 | 11/2011 | Matsuo et al. |
| 8,139,942 B2 | 3/2012 | Tsurumoto et al. |
| 8,186,600 B2 | 5/2012 | Cho |
| 2004/0232248 A1 | 11/2004 | Cho |
| 2005/0077356 A1* | 4/2005 | Takayama .......... G06K 7/10237 235/451 |
| 2006/0145660 A1* | 7/2006 | Black .................. H02J 7/025 320/108 |
| 2006/0209176 A1 | 9/2006 | Nakamura et al. |
| 2007/0243901 A1 | 10/2007 | Cho |
| 2008/0261525 A1 | 10/2008 | Matsuo et al. |
| 2009/0001930 A1* | 1/2009 | Pohjonen ............ H01Q 1/2225 320/108 |
| 2009/0060515 A1 | 3/2009 | Tsurumoto et al. |
| 2009/0127333 A1* | 5/2009 | Chamley ............. G06Q 20/341 235/380 |
| 2009/0203404 A1 | 8/2009 | Cho |
| 2010/0279606 A1* | 11/2010 | Hillan .................. H04B 5/00 455/41.1 |
| 2012/0033749 A1 | 2/2012 | Matsuo et al. |
| 2012/0064828 A1* | 3/2012 | Khan .................. H04L 63/0492 455/41.1 |
| 2012/0149301 A1* | 6/2012 | Wiley ................ H04B 5/0031 455/41.1 |
| 2012/0228391 A1 | 9/2012 | Cho |

FOREIGN PATENT DOCUMENTS

| | | |
|---|---|---|
| JP | 2006-279926 | 10/2006 |
| JP | 2006-332835 | 12/2006 |
| JP | 2008-271151 | 11/2008 |
| JP | 2009-65241 | 3/2009 |
| JP | 2010-187421 | 8/2010 |

* cited by examiner

FIG. 3

| | Command of wireless communication unit | Command of near-field communication unit |
|---|---|---|
| Request to write to main memory | 0x10 | 0xB |
| Request to read main memory | 0x11 | 0xA |
| Air conditioner power ON | 0x11A3 | 0xC124 |
| Temperature settings | 0x1234 | 0xD456 |

FIG. 4

| | Communication method | Content |
|---|---|---|
| Priority level 1 | Command from near-field communication control unit | Write command |
| Priority level 2 | Command from wireless communication unit | Read command |

FIG. 5

| | Communication method | Content |
|---|---|---|
| Priority level 1 | Command from near-field communication control unit or wireless communication unit | A command |
| Priority level 2 | Command from near-field communication control unit | Write command ... |
| Priority level 3 | Command from wireless communication unit | Read command ... |

TERMINAL DEVICE, AND COMMUNICATION METHOD AND COMMUNICATION MODULE FOR THE SAME

TECHNICAL FIELD

The present invention relates to terminal devices, and communication methods and communication modules for the same, and, more particularly, to a terminal device which perform communications using short-range radio communication (Near Field Communication: NFC) and wireless communication, and a communication method for the same.

BACKGROUND ART

The short-range radio communication (hereinafter, described as NFC or near-field communication) is near-field radio communication and has a short-range coverage area ranging from about 1 meter to about a few centimeters.

However, consumer electronics, even if wireless communication capabilities such as wireless LAN is equipped therewith, that have never been connected to a network have insufficient capability for display and input which are necessary to set wireless LAN settings. It is therefore expected to be difficult to establish network connection. Thus, it is expected that NFC capabilities and wireless communication capabilities will coexist in consumer electronics in the future (for example, Patent Literature (PTL) 1).

CITATION LIST

Patent Literature

[PTL 1] Japanese Unexamined Patent Application Publication No. 2010-187421

SUMMARY OF INVENTION

Technical Problem

However, considering a typical time to replace consumer electronics, it is conceivable that it takes time before devices originally having the NFC capabilities and the wireless communication capabilities coexisting therein as disclosed in PTL 1 penetrate the market.

Thus, the present invention is made in light of the above problem and has an object to provide a terminal device which can properly control communications using coexisting NFC and general radio communication without altering original functional parts of consumer electronics, a communication method for the terminal device, and a communication module.

Solution to Problem

To achieve the above objects, a terminal device according to one aspect of the present invention is a terminal device including: a near-field communication unit configured to perform near-field communications with an external reader/writer; a wireless communication unit configured to perform wireless communications with an external communication device; a terminal control unit configured to interpret only one of command schemes of the wireless communication unit and the near-field communication unit, and control a function of the terminal device; and a unit-to-unit communication control unit configured to control communications between the wireless communication unit and the terminal control unit and between the near-field communication unit and the terminal control unit, the unit-to-unit communication control unit including: an identification number addition unit configured to add an identification number to one of commands from the near-field communication unit and the wireless communication unit; and a command converting unit configured to convert a command of the other of the command schemes among the commands from the wireless communication unit and the near-field communication unit into a command of the one of the command schemes, using a command conversion table in which the command scheme of the wireless communication unit and the command scheme of the near-field communication unit are associated, wherein the unit-to-unit communication control unit communicates, to the terminal control unit, the command of the other of the command schemes which has the identification number added by the identification number addition unit, or the command of the one of the command schemes which has the identification number added by the identification number addition unit, the command of the other of the command schemes being converted into a command of the one of the command schemes.

It should be noted that the present invention can be implemented not only as a device but also as an integrated circuit including processing units included in such a device, a method including steps performed by the processing units included in the device, and a program for causing a computer to execute such steps.

Advantageous Effects of Invention

According to the present invention, it is feasible to implement a terminal device which can properly control communications using coexisting NFC and general wireless communication without altering original functional parts of consumer electronics, a communication method for the terminal device, and a communication module.

BRIEF DESCRIPTION OF DRAWINGS

FIG. 3 is a diagram showing an example of a command conversion table according to the present invention.

FIG. 4 is a diagram showing an example of priority information stored in a priority information storage unit according to the present invention.

FIG. 5 is a diagram showing another example of the priority information stored in the priority information storage unit according to the present invention.

Figure 1:
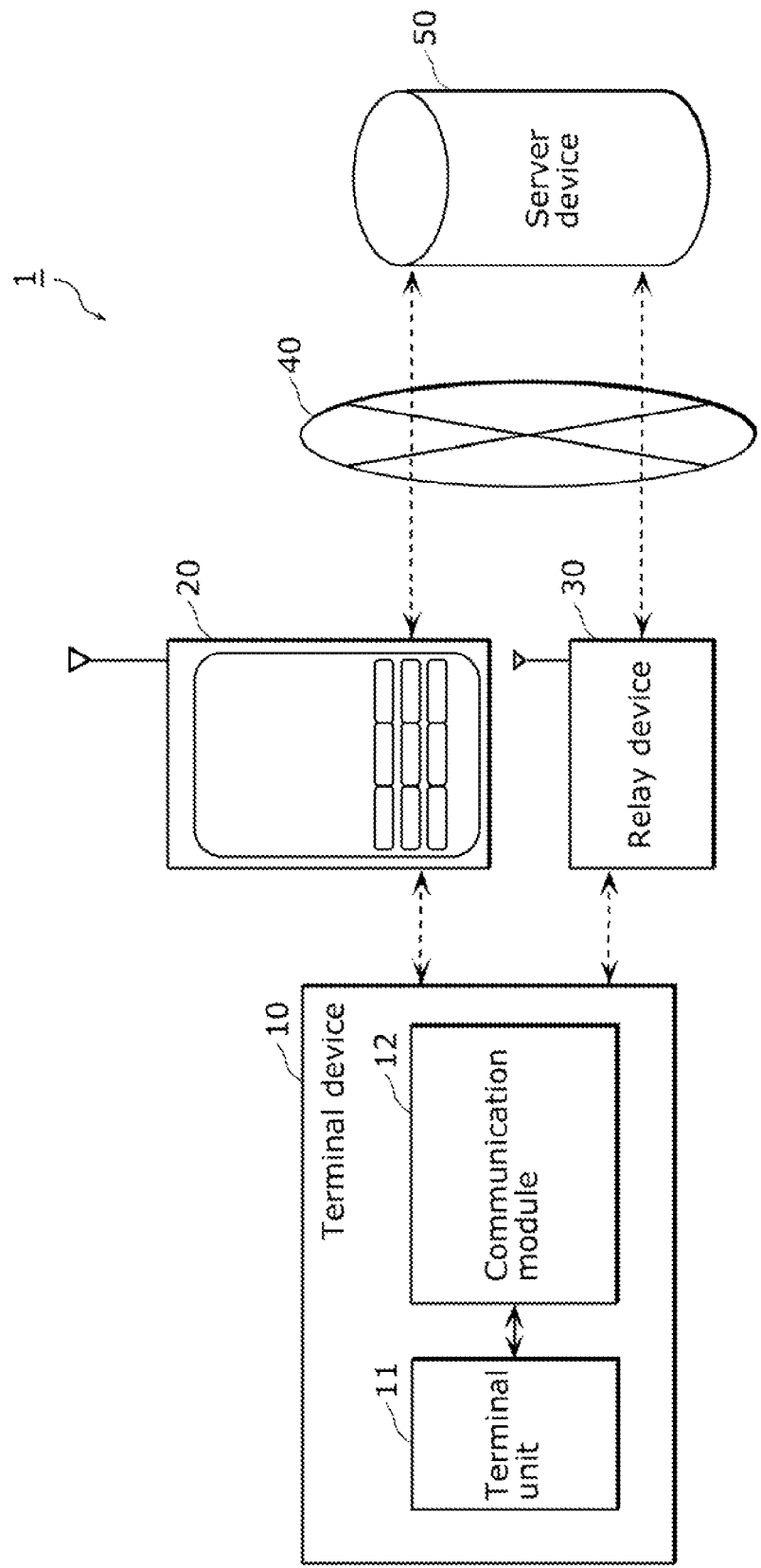
FIG. 1 is a diagram showing an example configuration of a system which includes a terminal device according to the present invention.

DESCRIPTION OF EMBODIMENTS (Underlying Knowledge Forming Basis of the Present Disclosure)

The short-range wireless communication (hereinafter, described as NFC or near-field communication) is near-field wireless communication and has a short-range coverage area ranging from about 1 meter to about a few centimeters. The near-field communication is employed in contactless IC cards (smart card) and RFIDs, improving user convenience. In recent years, an increasing number of mobile terminals such as mobile phones have the NFC incorporated therein, providing such convenience as paying in shops.

It is expected that as the more mobile terminals have NFC incorporated therein, the more consumer electronics including stationary audiovisual equipment, healthcare equipment, and white goods will have the NFC incorporated therein. This can improve the operability and convenience for user, by cooperation with a consumer electronic using the NFC, such as preparing and setting information for parameter settings of the consumer electronic in a mobile terminal and then sending, using the NFC, the information (data) to the consumer electronic.

On the other hand, for example, consumer electronics (smart appliance) that have mechanisms for automatically optimizing energy consumption in cooperation with smart grid or smart meter are estimated to be introduced to the market in the future. Such consumer electronics have a wireless communication module, such as RF, mounted thereon and are constantly connected to the Internet (constant connection) for optimization of energy consumption, thereby brining a merit to users. In other words, when environment is ready in which it is recognized as a great merit to users that consumer electronics are constantly connected to a network and used as network terminals, progress to constant network connection of consumer electronics (having wireless communication modules mounted thereon) is estimated.

However, consumer electronics, even if wireless communication capabilities such as wireless LAN is equipped therewith, that have never been connected to a network have insufficient capability for display and input which are necessary to set wireless LAN settings. It is therefore expected to be difficult to establish network connection. However, it is expected by application of the NFC capabilities to the consumer electronics that the problems are solved and further service deployment can be expected as well. Thus, it is expected that NFC capabilities and wireless communication capabilities will coexist in consumer electronics in the future (for example, PTL 1). The NFC is standardized as a low power radio communication technology in a proximity of 10's of centimeters, which is different from a typical wireless communication technology using, for example, RF. Therefore, a command scheme employed in the NFC is different from a command scheme employed in the typical wireless communication.

As a device in which the NFC capabilities and the wireless communication capabilities coexist, PTL 1 discloses an audio player which includes an NFC communication unit and a BT communication unit which performs wireless communications.

However, considering a typical time to replace consumer electronics, it is conceivable that it takes time before devices originally having the NFC capabilities and the wireless communication capabilities coexisting therein as disclosed in PTL 1 penetrate the market.

Thus, it is necessary for consumer electronics which have an NFC communication module (or a wireless communication module) and original functional parts of the consumer electronics mounted thereon to support two communication schemes, the NFC capabilities and the wireless communication capabilities, merely by replacing the communication module, without altering a microcomputer which controls the original functional parts. To reduce development costs, there is also need for implementing the two communication schemes, the NFC capabilities and the wireless communication capabilities, merely by replacing a communication module to be mounted on the consumer electronics, while using an existing microcomputer which controls the original functional parts (without replacing the microcomputer).

Here, the command scheme employed in the NFC is different from the command scheme employed in the typical wireless communication technique. Thus, in communication modules which merely have the NFC capabilities and the wireless communication capabilities incorporated in the NFC communication module (or the wireless communication module), a problem occurs that one of the communication means does not operate.

An embodiment of the present invention is made in light of the above problem and has an object to provide a terminal device which can properly control communications using coexisting NFC and general wireless communication without altering original functional parts of consumer electronics, a communication method for the terminal device, and a communication module.

To achieve the above object, the terminal device according to one aspect of the present invention is a terminal device including: a near-field communication unit configured to perform near-field communications with an external reader/writer; a wireless communication unit configured to perform wireless communications with an external communication device; a terminal control unit configured to interpret only one of command schemes of the wireless communication unit and the near-field communication unit, and control a function of the terminal device; and a unit-to-unit communication control unit configured to control communications between the wireless communication unit and the terminal control unit and between the near-field communication unit and the terminal control unit, the unit-to-unit communication control unit including: an identification number addition unit configured to add an identification number to one of commands from the near-field communication unit and the wireless communication unit; and a command converting unit configured to convert a command of the other of the command schemes among the commands from the wireless communication unit and the near-field communication unit into a command of the one of the command schemes, using a command conversion table in which the command scheme of the wireless communication unit and the command scheme of the near-field communication unit are associated, wherein the unit-to-unit communication control unit communicates, to the terminal control unit, the command of the other of the command schemes which has the identification number added by the identification number addition unit, or the command of the one of the command schemes which has the identification number added by the identification number addition unit, the command of the other of the command schemes being converted into a command of the one of the command schemes.

According to the above configuration, communications using coexisting NFC and general wireless communication without altering original functional parts of consumer electronics can be properly controlled.

Here, for example, the unit-to-unit communication control unit may further include a communication control unit configured to transmit a response command received from the terminal control unit as a response to the command communicated to the terminal control unit, to the near-field communication unit or the wireless communication unit, based on the identification number added to the command included in the response command.

Moreover, for example, using the command conversion table, the command converting unit may convert, among the commands received from the wireless communication unit and the near-field communication unit, the command of the other of the command schemes which has the identification number added by the identification number addition unit into a command of the one of the command schemes.

Moreover, for example, the identification number addition unit may add the identification number to the command obtained by the command converting unit converting the command of the other of the command schemes.

Moreover, for example, the unit-to-unit communication control unit may be serially connected to the terminal control unit.

Moreover, for example, the communication control unit may further serially communicate, to the terminal control unit, a command of the other of the command schemes which has been converted into a command of the one of the command schemes and has the identification number added by the identification number addition unit, or a command of the one of the command schemes which has the identification number added by the identification number addition unit.

Moreover, for example, the unit-to-unit communication control unit may further include a priority information storage unit configured to store priority information indicating which of the near-field communication unit and the wireless communication unit is given priority for communication, and based on the priority information, the communication control unit may block command communications between the terminal control unit and one of the near-field communication unit and the wireless communication unit, and perform the command communications between the terminal control unit and the other of the near-field communication unit and the wireless communication unit.

Moreover, for example, the priority information may include information indicating that the command communications between the near-field communication unit and the terminal control unit are given the priority over the command communications between the wireless communication unit and the terminal control unit.

Moreover, for example, the priority information may include information indicating a priority command which is a command to be preferentially communicated, and when the communication control unit receives the priority command from one of the near-field communication unit and the wireless communication unit, the communication control unit may block the command communications between the terminal control unit and the other of the near-field communication unit and the wireless communication unit, and perform the command communications between the terminal control unit and the one of the near-field communication unit and the wireless communication unit.

Moreover, for example, the unit-to-unit communication control unit may further include an extraction unit configured to extract a header of data stored in a storage unit of the terminal device, and the unit-to-unit communication control unit may transmit the header of the data to the near-field communication unit.

Moreover, for example, the unit-to-unit communication control unit may transmit the header of the data to the near-field communication unit when a size of the data is larger than or equal to a predetermined size, and transmit the data when the wireless communication unit is allowed to communicate with the external communication device.

Moreover, for example, when the unit-to-unit communication control unit receives from the near-field communication unit a command indicating that the data is to be transmitted to the wireless communication unit, the unit-to-unit communication control unit may transmit the data when the wireless communication unit is allowed to communicate with the external communication device.

Moreover, for example, the unit-to-unit communication control unit may include a broadcast information control unit configured to detect whether broadcast information is present which is to be informed to a user of the terminal device, and broadcast information control unit is configured to cause both the near-field communication unit and the wireless communication unit to store a broadcast command for allowing the user to acquire the broadcast information when the broadcast information control unit has detected that the broadcast information is present, and when one of the wireless communication unit and the near-field communication unit has communicated the broadcast command, the broadcast information control unit may cause the other of the wireless communication unit and the near-field communication unit to delete the broadcast command stored in the other of the wireless communication unit and the near-field communication unit.

Here, for example, the terminal device may further include a failure detection unit configured to detect failure of the wireless communication unit or the near-field communication unit, and the broadcast information may indicate the failure detected by the failure detection unit.

Moreover, to achieve the above object, a communication method according to one aspect of the present invention is a communication method executed by the terminal device including: a near-field communication unit for performing near-field communications with an external reader/writer; a wireless communication unit for performing wireless communications with an external communication device; a terminal control unit for interpreting only one of command schemes of the wireless communication unit and the near-field communication unit, and controlling a function of the terminal device; and a unit-to-unit communication control unit for controlling communications between the wireless communication unit and the terminal control unit and between the near-field communication unit and the terminal control unit, the communication method including: causing the unit-to-unit communication control unit to add an identification number to one of commands from the near-field communication unit and the wireless communication unit; and causing the unit-to-unit communication control unit to convert a command of the other of the command schemes among the commands from the wireless communication unit and the near-field communication unit into a command of the one of the command schemes, using a command conversion table in which the command scheme of the wireless communication unit and the command scheme of the near-field communication unit are associated, wherein the command of the other of the command schemes which has the identification number added by the identification number addition unit, or the command of the one of the command schemes which has the identification number added by the identification number addition unit is communicated to the terminal control unit, the command of the other of the command schemes being converted into a command of the one of the command schemes.

Moreover, to achieve the above object, a program according to one aspect of the present invention is a program for causing a terminal device including: a near-field communication unit for performing near-field communications with an external reader/writer; a wireless communication unit for performing wireless communications with an external communication device; a terminal control unit for interpreting only one of command schemes of the wireless communication unit and the near-field communication unit, and controlling a function of the terminal device; and a unit-to-unit communication control unit for controlling communications between the wireless communication unit and the terminal control unit and between the near-field communication unit and the terminal control unit, to execute: causing the unit-to-unit communication control unit to add an identification number to one of commands from the near-field communication unit and the wireless communication unit; and causing the unit-to-unit communication control unit to convert a command of the other of the command schemes among the commands from the wireless communication unit and the near-field communication unit into a command of the one of the command schemes, using a command conversion table in which the command scheme of the wireless communication unit and the command scheme of the near-field communication unit are associated, wherein the command of the other of the command schemes which has the identification number added by the identification number addition unit, or the command of the one of the command schemes which has the identification number added by the identification number addition unit is communicated to the terminal control unit, the command of the other of the command schemes being converted into a command of the one of the command schemes.

Moreover, to achieve the above object, a communication module according to one aspect of the present invention is a communication module including: a near-field communication unit configured to perform near-field communications with an external reader/writer; a wireless communication unit configured to perform wireless communications with an external communication device; a terminal control unit configured to interpret only one of command schemes of the wireless communication unit and the near-field communication unit, and control a function of the terminal device; and a unit-to-unit communication control unit configured to control communications between the wireless communication unit and the near-field communication unit, the unit-to-unit communication control unit including: an identification number addition unit configured to add an identification number to one of commands from the near-field communication unit and the wireless communication unit; and a command converting unit configured to convert a command of the other of the command schemes among the commands from the wireless communication unit and the near-field communication unit into a command of the one of the command schemes, using a command conversion table in which the command scheme of the wireless communication unit and the command scheme of the near-field communication unit are associated, wherein the unit-to-unit communication control unit communicates, to the terminal control unit, the command of the other of the command schemes which has the identification number added by the identification number addition unit, or the command of the one of the command schemes which has the identification number added by the identification number addition unit, the command of the other of the command schemes being converted into a command of the one of the command schemes.

Moreover, to achieve the above object, an integrated circuit according to one aspect of the present invention is an integrated circuit for controlling communications between a terminal control unit and a near-field communication unit and between the terminal control unit and a wireless communication unit, the terminal control unit being configured to interpret only one of command schemes of the wireless communication unit and the near-field communication unit, and control a function of the terminal device, the wireless communication unit being configured to perform wireless communications with an external communication device, the near-field communication unit being configured to perform near-field communications with an external reader/writer, and the unit-to-unit communication control unit including: an identification number addition unit configured to add an identification number to one of commands from the near-field communication unit and the wireless communication unit; and a command converting unit configured to convert a command of the other of the command schemes among the commands from the wireless communication unit and the near-field communication unit into a command of the one of the command schemes, using a command conversion table in which the command scheme of the wireless communication unit and the command scheme of the near-field communication unit are associated, wherein the unit-to-unit communication control unit communicates, to the terminal control unit, the command of the other of the command schemes which has the identification number added by the identification number addition unit, or the command of the one of the command schemes which has the identification number added by the identification number addition unit, the command of the other of the command schemes being converted into a command of the one of the command schemes.

Hereinafter, embodiments according to the present invention will be described in detail, with reference to accompanying drawings. It should be noted that the embodiments described below are merely preferred illustration of the present invention. Values, shapes, materials, components, disposition or a form of connection between the components, steps, and the order of the steps are merely illustrative. Thus, the present invention is not limited to the embodiments. The present invention is determined only by the scope of the claims. Thus, among components of the below embodiments, components not set forth in the independent claims indicating the top level concept of the present invention are not necessary to achieve the present invention but will be described as components for preferable embodiments.

Embodiment 1

FIG. 1 is a diagram showing an example configuration of a system which includes a terminal device according to the present invention. A system 1 shown in FIG. 1 includes a terminal device 10, a portable device 20 which is a reader/writer, a relay device 30, and a server device 50.

The terminal device 10 is a consumer electronic such as air conditioners, microwave ovens, washer/dryers, TVs, and blood pressure monitors. The terminal device 10 includes a terminal unit 11 which has functions (the original functions) except for communication capability of the terminal device 10, and a communication module 12 which has the communication capability.

The portable device 20 has NFC capability incorporated therein. The portable device 20 corresponds to a reader/writer according to the present invention. The portable device 20 performs near-field communications with the terminal device 10.

The relay device 30 is, for example, a gateway device, and has a function to connect the terminal device 10 to a network 40, using wireless communications.

The server device 50 is present on the network 40 and includes a database storing information related to the terminal device 10.

The system 1 is configured as described above.

Figure 2:
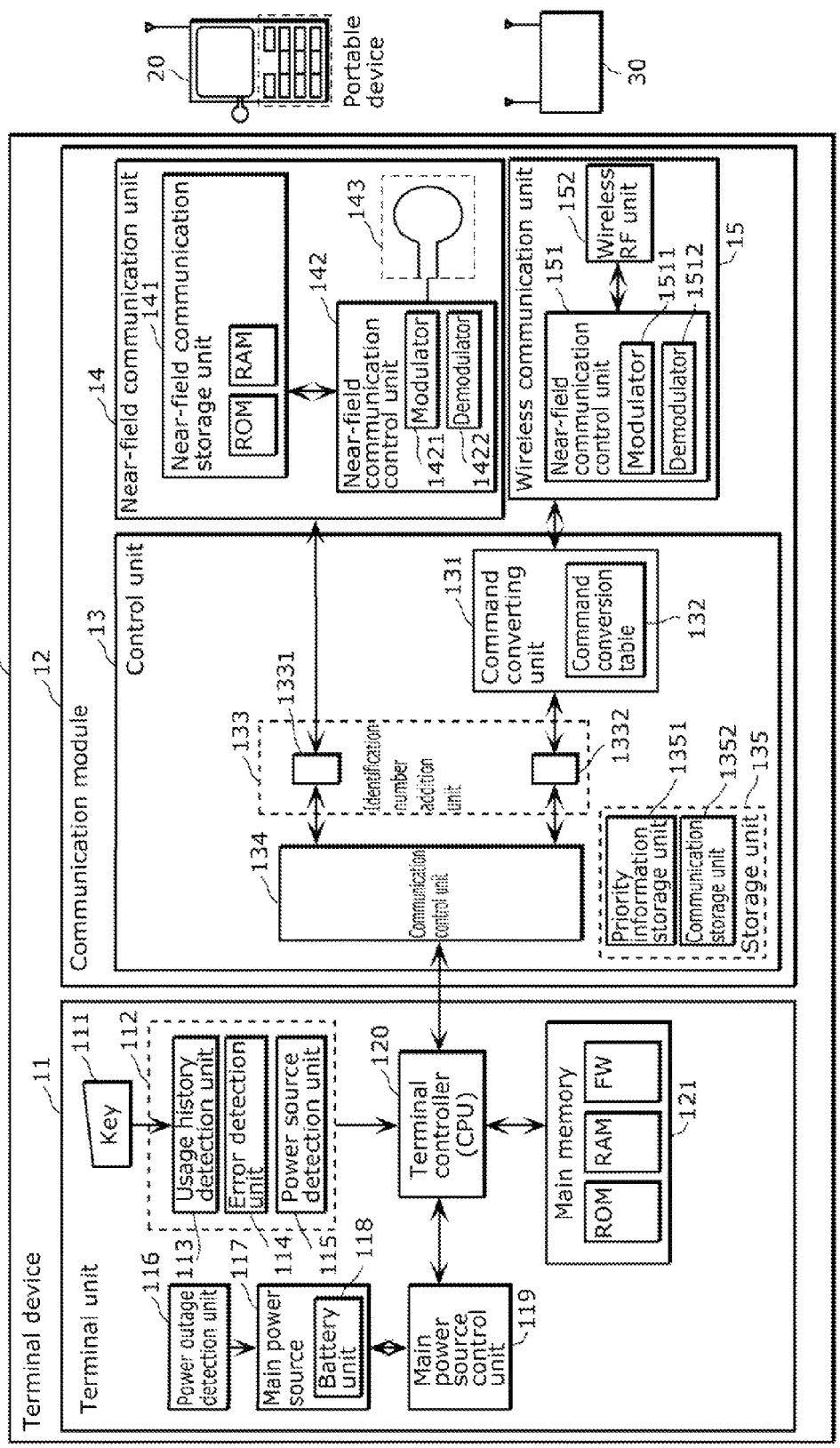
FIG. 2 is a block diagram of an example configuration of a terminal device according to an embodiment 1.

FIG. 2 is a block diagram of an example configuration of the terminal device according to the embodiment 1.

The terminal device 10 includes, as described above, the terminal unit 11 which has the original functions of the terminal device 10, and the communication module 12 which has the communication capability.

First, the configuration of the terminal unit 11 will be described.

The terminal unit 11 serves as a primary function (the original functions) of the terminal device 10 except for the communication capability, and is refrigerating functionality in terms of refrigerators, heating function functionality in terms of microwave ovens, and air conditioning function functionality in terms of air conditioners. The terminal device 10 according to the present embodiment is directed to all consumer electronics including electronic device terminals such as audiovisual consumer electronics and white goods such as refrigerators. Hereinafter, functional description for each consumer electronic will be omitted and only functions common to the consumer electronics will be described.

The terminal unit 11 includes: a key 111; a detection unit 112 which includes a usage history detection unit 113, an error detection unit 114, and a power source detection unit 115; a power outage detection unit 116; a main power source 117 which includes a battery unit 118; a main power source control unit 119; a terminal controller 120; and a main memory 121.

The key 111 is an operation button of the terminal device 10 and accepts user operation.

The usage history detection unit 113 detects, as usage history, operation history indicating history of key operation in accordance with user operation of the key 111, and accumulates (stores) the usage history in the main memory 121. The usage history continues to accumulate. Thus, preferably, the main memory 121 has an FIFO (First In First Out) stack configuration so that new history information is recorded in a memory area which can accumulate the usage history information.

The main power source 117 is a main power supply for the terminal device 10 and supplies power using a battery or electric outlet connection. The main power source 117 supplies power to at least the terminal unit 11 and the communication module 12. Also, the main power source 117 includes the battery unit 118, and can continuously supply power for a period of time by causing the battery unit 118 to supply power, even when the outlet is blocked.

The power outage detection unit 116 detects that a source of power such as an outlet is inadvertently lost in the terminal device 10 not equipped with an accumulator such as a battery. For example, the power outage detection unit 116 detects the loss from, for example, reduction in voltage applied to the main power source 117. When the outlet is lost, the power outage detection unit 116 operates by being supplied with power from the battery unit 118, and detects that a source of power such as an outlet is inadvertently lost.

Moreover, the power outage detection unit 116 notifies the power source detection unit 115 of the detection of the outage of the power source.

The power source detection unit 115 detects a power state of the main power source 117 described below. Here, the power state includes at least three states, a state in which the power is on, a state (sleep mode) in which the power is controllable by the controller, and a state in which the power is off. Specifically, the power source detection unit 115 detects the powered-on state when the terminal unit 11 is powered on. The power source detection unit 115 also detects transition of the terminal unit 11 to the sleep mode or the powered-off state immediately before the terminal unit 11 is placed into the sleep mode or the powered-off state, and stores the power state in the main memory 121. Alternatively, the power source detection unit 115 may store flag information indicating the outage of the power source into the main memory 121 when the power source detection unit 115 is notified of the outage of the power source by the power outage detection unit 116.

The main power source control unit 119, for example, begins (activates) or stops (deactivates) the power supply to the terminal device 10, in accordance with an activation instruction or a deactivation instruction from the terminal controller 120, respectively.

The terminal controller 120 corresponds to a terminal control unit according to the present invention. The terminal controller 120 interprets only one of command schemes of a wireless communication unit 15 and a near-field communication unit 14, and controls functions of the terminal device 10. Specifically, the terminal controller 120 is a system controller which can control at least the usage history detection unit 113, the detection unit 112, the power outage detection unit 116, the main power source 117, the main power source control unit 119, and the main memory 121, and controls the primary functions of the terminal device 10 except for the communication capability. The terminal controller 120 includes, what is called, a microcomputer or a CPU.

In the present embodiment, the terminal controller 120 interprets the command scheme of only the near-field communication unit 14.

The main memory 121 stores necessary information in the terminal unit 11. The main memory 121 includes therein, for example, a non-writable ROM area, a rewritable RAM area, and an FW area storing firmware (FW) in which a control procedure of the terminal controller 120 is written. The ROM area records information including, for example, identification information identifying the terminal unit 11, manufacture date, and identification information of a manufacturer. The RAM area records information including, for example, the usage history information collected by the usage history detection unit 113, and error information of the terminal device 10 which is detected by the error detection unit 114. The FW area records, for example, the firmware which is the control procedure of the terminal controller 120. Here, the FW area may include a ROM memory or include a RAM memory.

The terminal unit 11 is configured as described above, and controlled by the terminal controller 120 which interprets only one of the command schemes of the wireless communication unit 15 and the near-field communication unit 14.

Subsequently, the configuration of the communication module 12 will be described.

The communication module 12 in the terminal device 10 is replaceable. In the present embodiment, the following description will be given assuming that a command scheme interpreted by the terminal controller 120 which controls the terminal unit 11 is the command scheme of the near-field communication unit 14.

The communication module 12 includes a control unit 13, the near-field communication unit 14, and the wireless communication unit 15.

The near-field communication unit 14 corresponds to a near-field communication unit according to the present invention. The near-field communication unit 14 performs the near-field communications with an external reader/writer. Specifically, the near-field communication unit 14 performs the near-field communications with the portable device 20 which is the external reader/writer, and communicates with the control unit 13 in the terminal device 10. The near-field communication unit 14 includes a near-field communication storage unit 141, a near-field communication control unit 142, and an antenna 143.

The antenna 143 is, for example, a loop antenna, and receives a radio wave from the portable device 20 which is the external reader/writer.

The near-field communication control unit 142 includes a modulator 1421 and a demodulator 1422.

The demodulator 1422 demodulates the radio wave received by the antenna 143 and conveys (transmits) the demodulated radio wave to the control unit 13. The modulator 1421 modulates information conveyed from the control unit 13, and transmits the modulated information via the antenna 143. Herein, the information may be data which includes payload and a header or may be a command to the portable device 20.

In the present embodiment, the near-field communication control unit 142 operates by interpreting a command scheme (hereinafter, also described as an NFC command scheme) defined by NFC standards, and conveys a command of the NFC command scheme, or the command of the NFC command scheme and the information to the control unit 13.

The near-field communication storage unit 141 includes therein a ROM area and a RAM area, and records a portion of data which is related to the terminal device 10 (the terminal unit 11) and stored in the main memory 121, information for performing the near-field communications with the portable device 20, or the like.

The near-field communication storage unit 141 stores, for example, identification information uniquely identifying the near-field communication unit 14, a terminal device identifier identifying the terminal device 10, a model of the terminal device, address information of the relay device 30, and address information to the server device 50. The near-field communication storage unit 141 temporarily stores information transferred from the portable device 20 as well. It should be noted that the near-field communication storage unit 141 may store, for example, information such as the usage history information extracted by the usage history detection unit 113 of the terminal unit 11, the error information detected by the error detection unit 114, and the power state information detected by the power source detection unit 115.

Subsequently, the configuration of the wireless communication unit 15 will be described.

The wireless communication unit 15 corresponds to a wireless communication unit according to the present invention. The wireless communication unit 15 wirelessly communicates with an external communication device. Specifically, the wireless communication unit 15 wirelessly communicates with the relay device 30 which is the external communication device, and communicates with the control unit 13 in the terminal device 10. The wireless communication unit 15 includes a wireless communication control unit 151 and a wireless RF unit 152.

The wireless RF unit 152 wirelessly communicates with the relay device 30 at radio frequency (RF). Here, RF is a frequency range available for the wireless communications.

The wireless communication control unit 151 includes a modulator 1511 and a demodulator 1512.

The demodulator 1512 demodulates the radio wave received by the wireless RF unit 152, and conveys (transmits) the demodulated radio wave to the control unit 13. The modulator 1511 modulates information conveyed from the control unit 13, and transmits the modulated information to the wireless RF unit 152. Herein, the information may be, as described above, the data which includes the payload and the header or may be a command to the relay device 30 or the server device 50.

In the present embodiment, the wireless communication control unit 151 operates by interpreting a command scheme (hereinafter, also described as a wireless RF command scheme) defined by RF technology, and conveys a command of the wireless RF command scheme, or the command of the wireless RF command scheme and information to the control unit 13.

It should be noted that the wireless RF command scheme and the NFC command scheme are different command schemes. In other words, the wireless RF command scheme and the NFC command scheme have different commands assigned to a desired operation.

Subsequently, the configuration of the control unit 13 will be described.

The control unit 13 corresponds to a unit-to-unit communication control unit according to the present invention. The control unit 13 controls communications between the terminal controller 120 and the near-field communication unit 14 and between the terminal controller 120 and the wireless communication unit 15. Specifically, the control unit 13 interprets only one of the command schemes of the near-field communication unit 14 and the wireless communication unit 15, and controls communications between the near-field communication unit and the terminal controller 120 which controls the functions of the terminal device 10, and between the wireless communication unit 15 and the terminal controller 120. The control unit 13 includes a command converting unit 131, an identification number addition unit 133, a communication control unit 134, and a storage unit 135. It should be noted that in the present embodiment, the control unit 13 and the terminal unit 11 are coupled via a serial interface. Specifically, the control unit 13 is serially connected to the terminal controller 120.

The command converting unit 131 corresponds to a command converting unit according to the present invention. The command converting unit 131 converts, among commands from the near-field communication unit 14 and the wireless communication unit 15, a command of the other of the command schemes into a command of the one of the command schemes, using a command conversion table 132 in which the command scheme (the NFC command scheme) of the near-field communication unit 14 and the command scheme (the wireless RF command scheme) of the wireless communication unit 15 are associated.

Here, FIG. 3 is a diagram showing an example of the command conversion table according to the present invention. FIG. 3 shows an example where the terminal device 10 is an air conditioner. As shown in FIG. 3, the command conversion table 132 shows commands assigned to desired operations such as a request to write to the main memory 121, a request to read the main memory 121, air conditioner power ON, and temperature settings.

Using such a command conversion table 132, the command converting unit 131 converts a command scheme. In the present embodiment, a command scheme interpreted by the terminal controller 120 which controls the terminal unit 11 is the command scheme of the near-field communication unit 14. In other words, the command converting unit 131 converts a command conveyed from the wireless communication unit 15 into a command corresponding to the command scheme of the near-field communication unit 14.

The identification number addition unit 133 corresponds to an identification number addition unit according to the present invention. The identification number addition unit 133 adds an identification number to a command from the near-field communication unit 14 or the wireless communication unit 15. In the present embodiment, the identification number addition unit 133 is configured between the command converting unit 131 and the communication control unit 134. In other words, the identification number addition unit 133 adds an identification number to a command from the near-field communication unit 14. Also, for a command from the wireless communication unit 15, the identification number addition unit 133 uses the command converting unit 131 to convert the command scheme of the command, and adds an identification number to the resultant command. Specifically, the identification number addition unit 133 includes a first identification number addition unit 1331 and a second identification number addition unit 1332. The first identification number addition unit 1331 adds to an inputted command an identification number identifying the correspondence of the command to the near-field communication unit 14. The second identification number addition unit 1332 adds to an inputted command an identification number identifying the correspondence of the command to the wireless communication unit 15.

It should be noted that the identification number addition unit 133 may pass therethrough the command conveyed from the communication control unit 134, or remove the identification number added to the conveyed command and convey the resultant command. The identification number added to the command may be meaningless to the terminal controller 120 of the terminal unit 11.

The storage unit 135 includes at least a priority information storage unit 1351 and a communication storage unit 1352.

The priority information storage unit 1351 corresponds to a priority information storage unit according to the present invention. The priority information storage unit 1351 stores priority information indicating which of the near-field communication unit 14 and the wireless communication unit 15 is given priority for communications.

In the present embodiment, for example, as shown in FIG. 4, the priority information storage unit 1351 stores priority information which includes information indicating that the command communications between the near-field communication unit 14 and the terminal unit 11 are given the priority over the command communications between the wireless communication unit 15 and the terminal unit 11. Here, FIG. 4 is a diagram showing an example of the priority information stored in the priority information storage unit according to the present invention.

It should be noted that as shown in FIG. 5, the priority information storage unit 1351 may further store priority information which includes information indicating a priority command which is a command (A command in the figure) to be communicated preferentially. Here, FIG. 5 is a diagram showing another example of the priority information stored in the priority information storage unit according to the present invention.

The communication storage unit 1352 stores information for controlling communications between the near-field communication unit 14 and the terminal controller 120 and between the wireless communication unit 15 and the terminal controller 120. It should be noted that the communication storage unit 1352 may also temporarily store the portion of data which is related to the terminal device 10 (the terminal unit 11) and stored in the main memory 121.

The communication control unit 134 corresponds to a communication control unit according to the present invention. The communication control unit 134 communicates a response command from the terminal controller 120, which the communication control unit 134 has received as a response to the command communicated to the terminal controller 120, to the near-field communication unit 14 or the wireless communication unit 15, based on the identification number added to a command included in the response command. For example, the communication control unit 134 communicates to the terminal controller 120, a command which is of the one command scheme, has the identification number added by the identification number addition unit 133 and is obtained by converting a command of the other command scheme, or the command of the one command scheme which has the identification number added by the identification number addition unit 133.

Specifically, the communication control unit 134 is serially connected to the terminal controller 120. The communication control unit 134 serially communicates, to the terminal controller 120, the command of the one command scheme (the NFC command scheme) which has the identification number added by the identification number addition unit 133 and is obtained by converting the command of the other command scheme (the command of the wireless RF command scheme). Also, the communication control unit 134 serially communicates, to the terminal controller 120, the command of the one command scheme (the NFC command scheme) which has the identification number added by the identification number addition unit 133.

Here, it is assumed that the communication control unit 134 controls the command communications between the terminal controller 120 and one of the near-field communication unit 14 and the wireless communication unit 15. In that case, the communication control unit 134 blocks the command communication between the terminal controller 120 and one of the near-field communication unit 14 and the wireless communication unit 15, and performs the command communications between the terminal controller 120 and the other of the near-field communication unit 14 and the wireless communication unit 15, based on the priority information stored in the priority information storage unit 1351. It should be noted that description will be given where the command communications include communications of only a command, and also communications of data after the command is communicated.

In the present embodiment, if a command is conveyed from the near-field communication unit 14 when the communication control unit 134 controls the command communications between the wireless communication unit 15 and the terminal controller 120, the communication control unit 134 blocks the command communications between the wireless communication unit 15 and the terminal controller 120 and performs the command communications between the near-field communication unit 14 and the terminal controller 120, based on the priority information.

When the communication control unit 134 receives the priority command from one of the near-field communication unit 14 and the wireless communication unit 15, the communication control unit 134 blocks the command communications between the terminal controller 120 and the other of the near-field communication unit 14 and the wireless communication unit 15, and performs the command communications between the terminal control unit and the one of the near-field communication unit 14 and the wireless communication unit 15. For example, when the communication control unit 134 receives the priority command from the wireless communication unit 15, the communication control unit 134 blocks command communications between the terminal controller 120 and the near-field communication unit 14 if the command communications are being performed, and performs command communications corresponding to the priority command, between the wireless communication unit 15 and the terminal control unit. For example, when the communication control unit 134 receives the priority command from the near-field communication unit 14, even if the command communications are being performed between the near-field communication unit 14 and the terminal controller 120, the communication control unit 134 interrupts the command communications, and performs the command communications corresponding to the priority command, between the near-field communication unit 14 and the terminal control unit.

The control unit 13 configured as described above.

Next, operation of the terminal device 10 configured as set forth above will be described.

Figure 6:
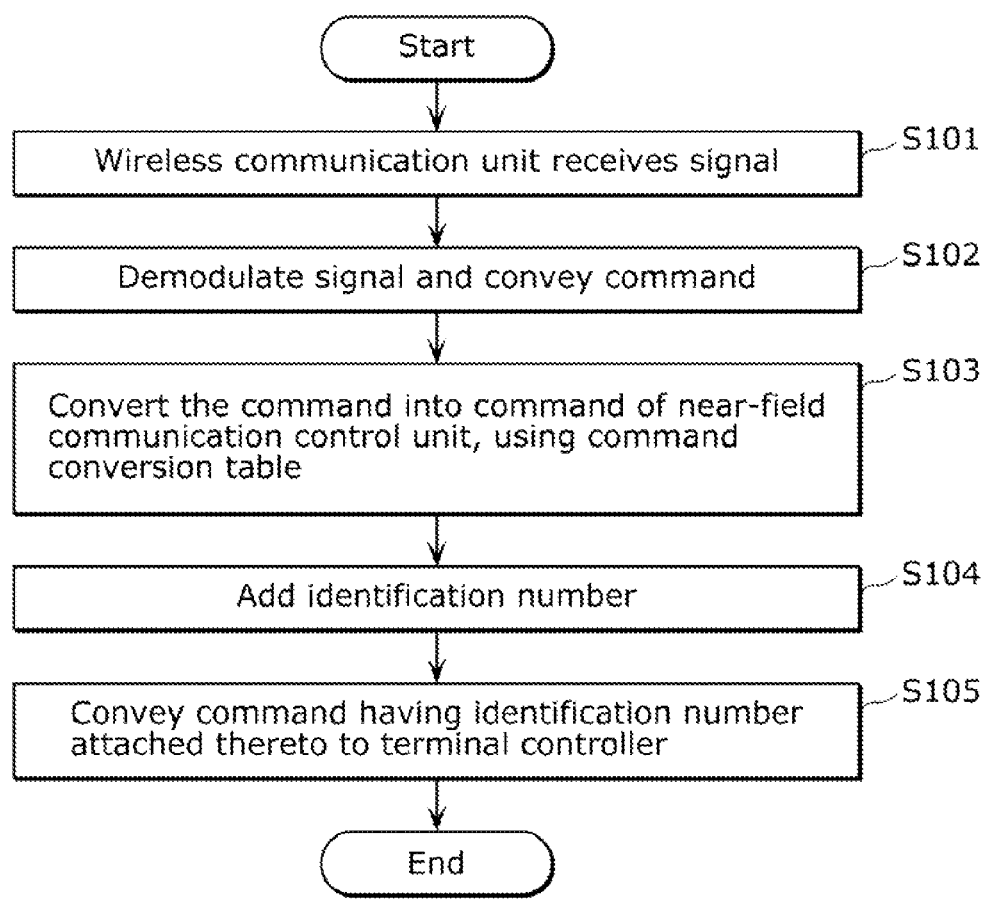
FIG. 6 is a flowchart illustrating an example of a command communication process when a command is converted by a communication module according to the embodiment 1.

FIG. 6 is a flowchart illustrating an example of a command communication process in which a command is converted by the communication module according to the embodiment 1.

First, the wireless communication unit 15 wirelessly communicates with the relay device 30 which is the external communication device, and receives a signal propagation (S101).

Next, the wireless communication unit 15 demodulates the received signal and conveys a command obtained by demodulating the signal to the control unit 13 (S102).

Next, the control unit 13 uses the command converting unit 131 to receive the command conveyed from the wireless communication unit 15. The command converting unit 131 converts the received command into a command of the command scheme of the near-field communication unit 14, using the command conversion table 132 (S103). The command converting unit 131 conveys the command obtained from the conversion to the second identification number addition unit 1332.

Next, the second identification number addition unit 1332 adds an identification number corresponding to the wireless communication unit 15, to the conveyed command (S104).

Next, the second identification number addition unit 1332 conveys to the communication control unit 134 the command having the identification number added thereto (S105).

Then, the communication control unit 134 conveys the conveyed command to the terminal controller 120 serially connected to the communication control unit 134.

Figure 7:
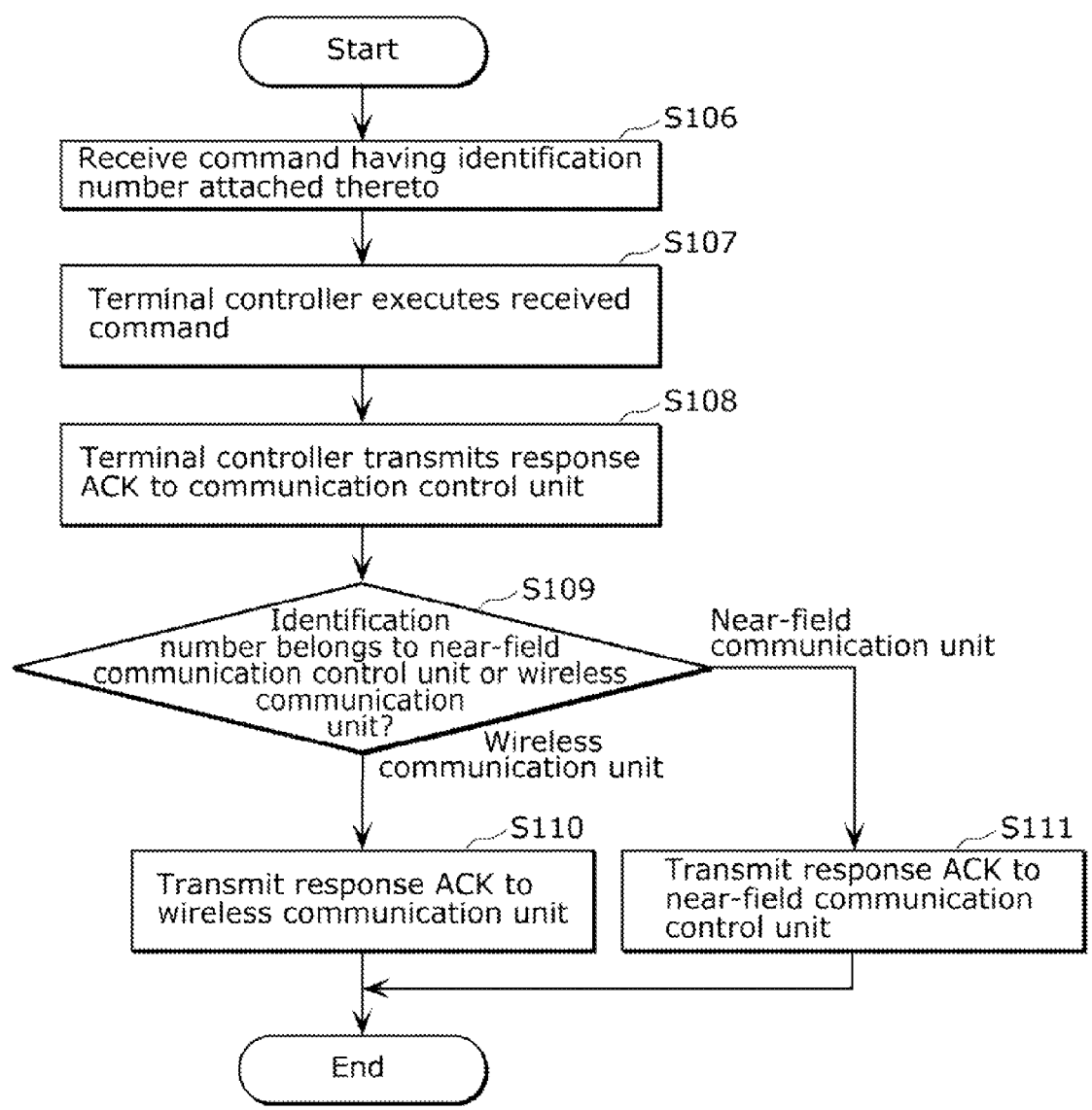
FIG. 7 is a flowchart illustrating an example of a response process of the communication module according to the embodiment 1.

FIG. 7 is a flowchart illustrating an example of a response process of the communication module according to the embodiment 1.

It is assumed that the communication module 12 first conveys a command(s) having the identification number(s) corresponding to the near-field communication unit 14 or/and the wireless communication unit 15 added thereto, and the terminal unit 11 receives the command(s) (S106).

Next, the terminal unit 11, i.e., the terminal controller 120 performs operation in response to the received command (S107), and together, transmits a response command (response ACK), responsive to the received command, to the communication control unit 134 (S108). Here, the response ACK includes information to indicate a response to the received command, and the information includes the identification number described above.

Next, the communication control unit 134 determines the identification number included in the response ACK which is conveyed from the terminal controller 120 (S109).

When the identification number corresponds to the wireless communication unit 15, the communication control unit 134 transmits the response ACK to the wireless communication unit 15 (S110).

On the other hand, when the identification number corresponds to the near-field communication unit 14, the communication control unit 134 transmits the response ACK to the near-field communication unit 14 (S111).

In this manner, the communication control unit 134 communicates the response command to the near-field communication unit 14 or the wireless communication unit 15, based on the identification number added to the command included in the response command.

Figure 8:
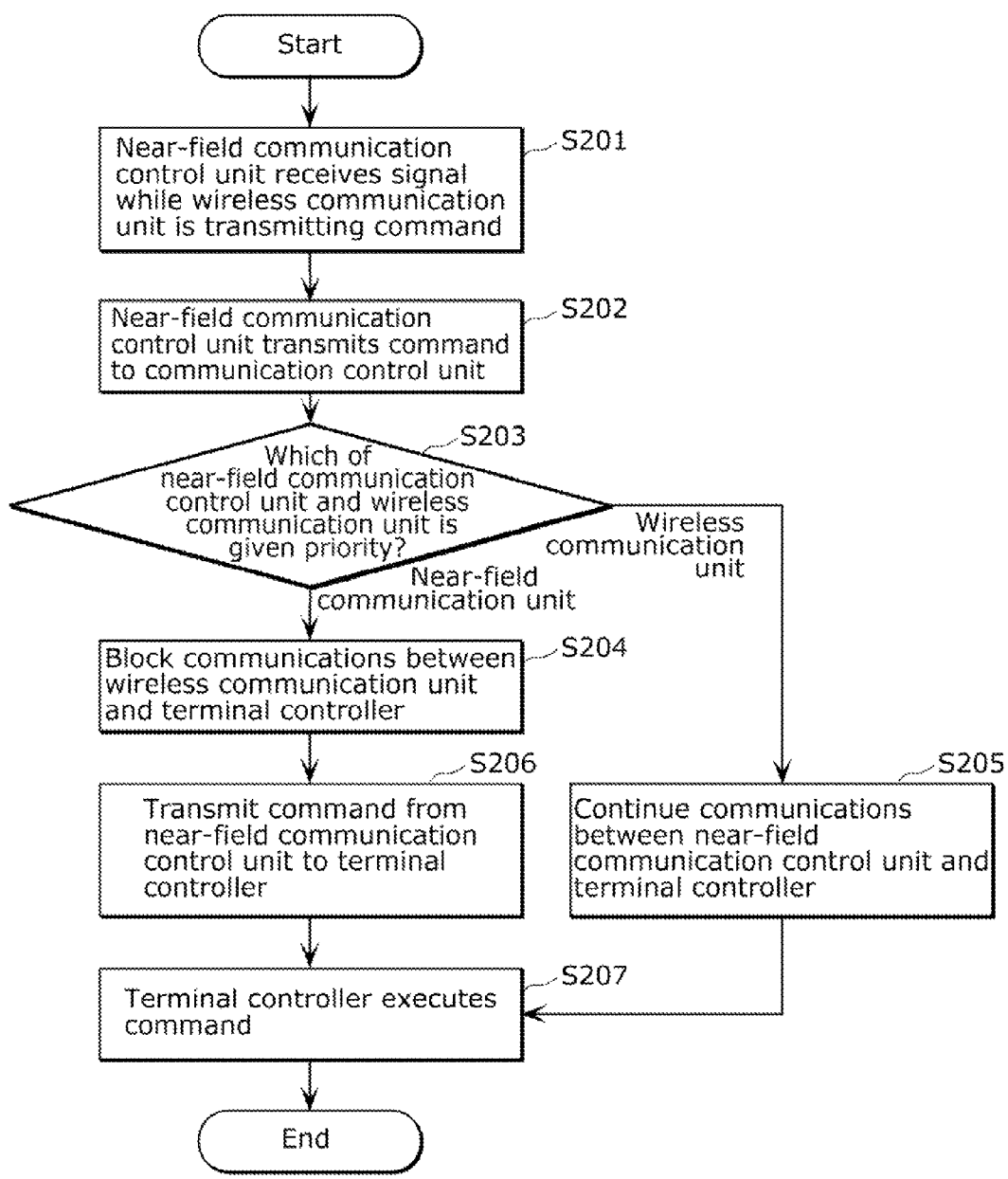
FIG. 8 is a flowchart illustrating an example of a communication process of the communication module based on the priority information according to the embodiment 1.

FIG. 8 is a flowchart illustrating an example of a communication process of the communication module based on the priority information according to the embodiment 1.

First, the communication control unit 134 is controlling the command communications between the wireless communication unit 15 and the terminal controller 120.

It is assumed that, next, the near-field communication unit 14 receives a signal while the communication control unit 134 is transmitting a command (a converted command), which is from the wireless communication unit 15, to the terminal controller 120 (S201).

Next, the near-field communication unit 14 transmits a command obtained by demodulating the received command to the communication control unit 134 (S202).

Here, the communication control unit 134 checks the priority information stored in the priority information storage unit 1351 to determine which of the commands of the near-field communication unit 14 and the wireless communication unit 15 is to preferentially communicate to the terminal controller 120 (S203).

When the command of the near-field communication unit 14 is given the priority based on the priority information stored in the priority information storage unit 1351, the communication control unit 134 blocks the command communications between the wireless communication unit 15 and the terminal controller 120 (S204).

Next, the communication control unit 134 transmits (command communicates) the command from the near-field communication unit 14 to the terminal controller 120 (S206).

Next, the terminal controller 120 executes the received command (S207). Specifically, the terminal controller 120 performs operation in response to the received command.

While in the present embodiment, the description has been given where the command of the near-field communication unit 14 is given the priority, the present invention is not limited thereto. The command of the wireless communication unit 15 may be given the priority. In that case, when the command of the wireless communication unit 15 is given the priority based on the priority information stored in the priority information storage unit 1351 in S203, the communication control unit 134 continues the command communications between the wireless communication unit 15 and the terminal controller 120 (S205).

In this manner, the communication module 12 performs the communication process based on the priority information.

Figure 9:
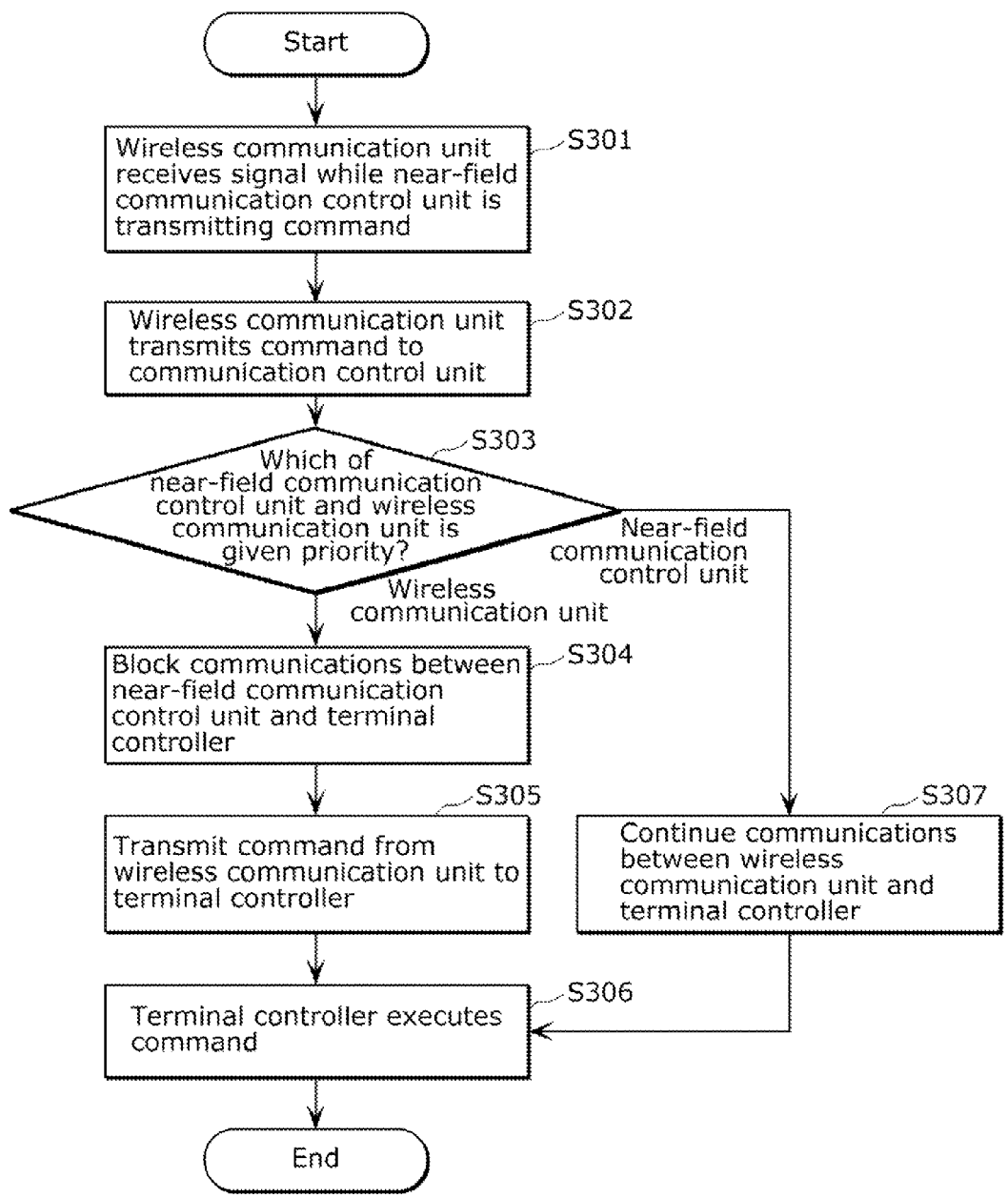
FIG. 9 is a flowchart illustrating another example of the communication process of the communication module based on the priority information according to the embodiment 1.

While in FIG. 8, the description has been given assuming that the near-field communication unit 14 receives the signal while the communication control unit 134 is transmitting the command (the converted command), which is from the wireless communication unit 15, to the terminal controller 120, the present invention is not limited thereto. As shown in FIG. 9, it may be, of course, assumed that the wireless communication unit 15 receives a signal while the communication control unit 134 is transmitting the command, which is from the near-field communication unit 14, to the terminal controller 120.

Here, FIG. 9 is a flowchart illustrating another example of the communication process of the communication module based on the priority information according to the embodiment 1. It should be noted that processing of S301 through S307 illustrated in FIG. 9 is for the case where the near-field communication unit 14 and the wireless communication unit 15 are exchanged in the processing of S201 through S207 illustrated in FIG. 8, and thus the processing is the same as described with reference to FIG. 8. Hence, the description will be omitted.

As described above, according to the present embodiment, it is feasible to implement a terminal device which can properly control communications using coexisting NFC and general wireless communication without altering original functional parts of consumer electronics, and a communication method for the terminal device.

Figure 10:
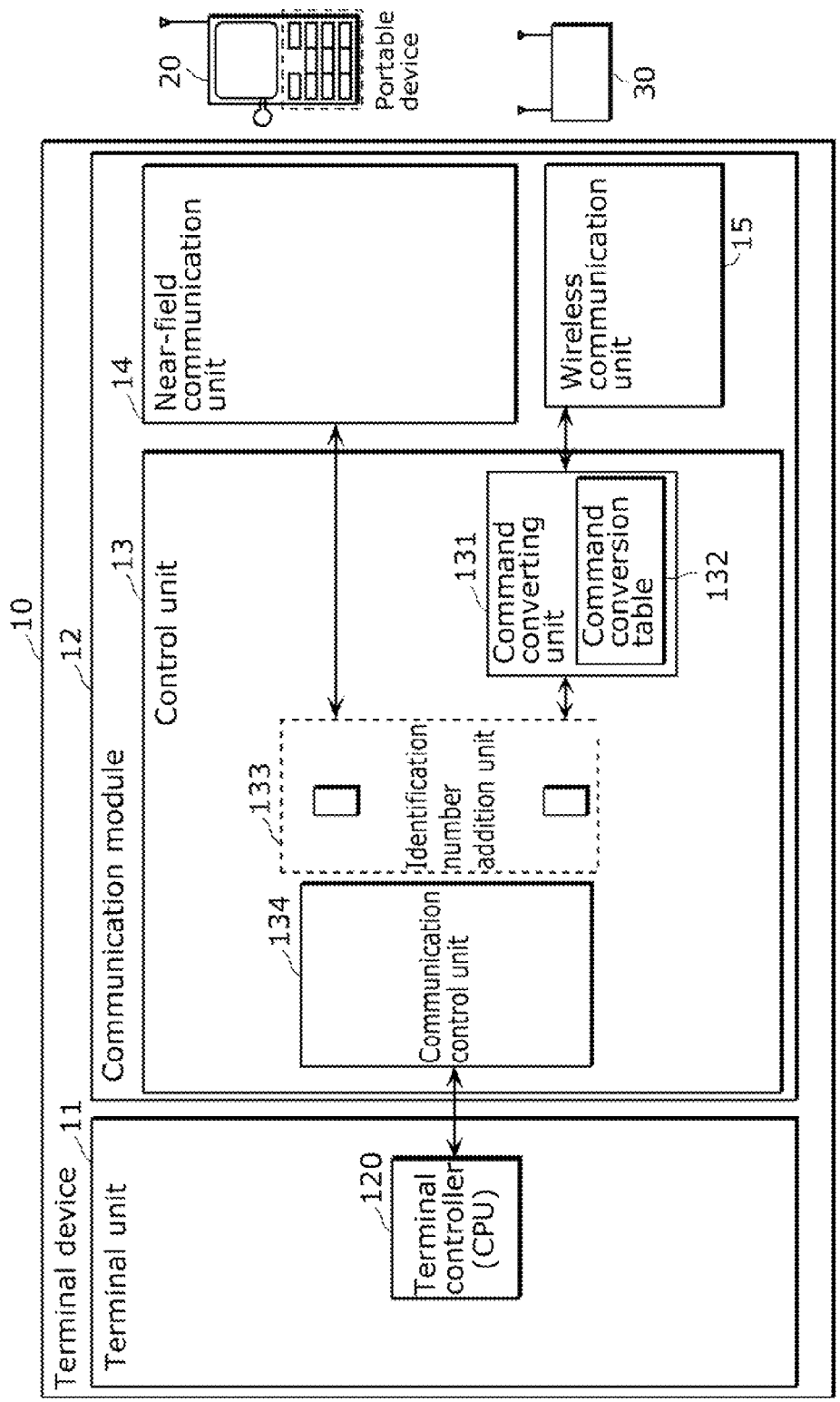
FIG. 10 is a block diagram of the minimum configuration of a communication device according to the present invention.

While in the present embodiment, the configuration of the terminal device 10 has been described specifically, the configuration is merely a preferred illustration of the present invention. As shown in FIG. 10, the terminal device 10 may include, as the minimum configuration: the terminal unit 11; the control unit 13 which includes the communication control unit 134, the command converting unit 131 which includes the command conversion table 132, and the identification number addition unit 133; the near-field communication unit 14; and the wireless communication unit 15. Here, FIG. 10 is a block diagram of the minimum configuration of a communication device according to the present invention.

(Variation 1)

While in the embodiment 1, the description has been given that the command scheme interpreted by the terminal controller 120 which controls the terminal unit 11 is the command scheme of only the near-field communication unit, the present invention is not limited thereto. The command scheme interpreted by the terminal controller 120 may be the command scheme of only the wireless communication unit. Such a case will be described as a variation 1.

Figure 11:
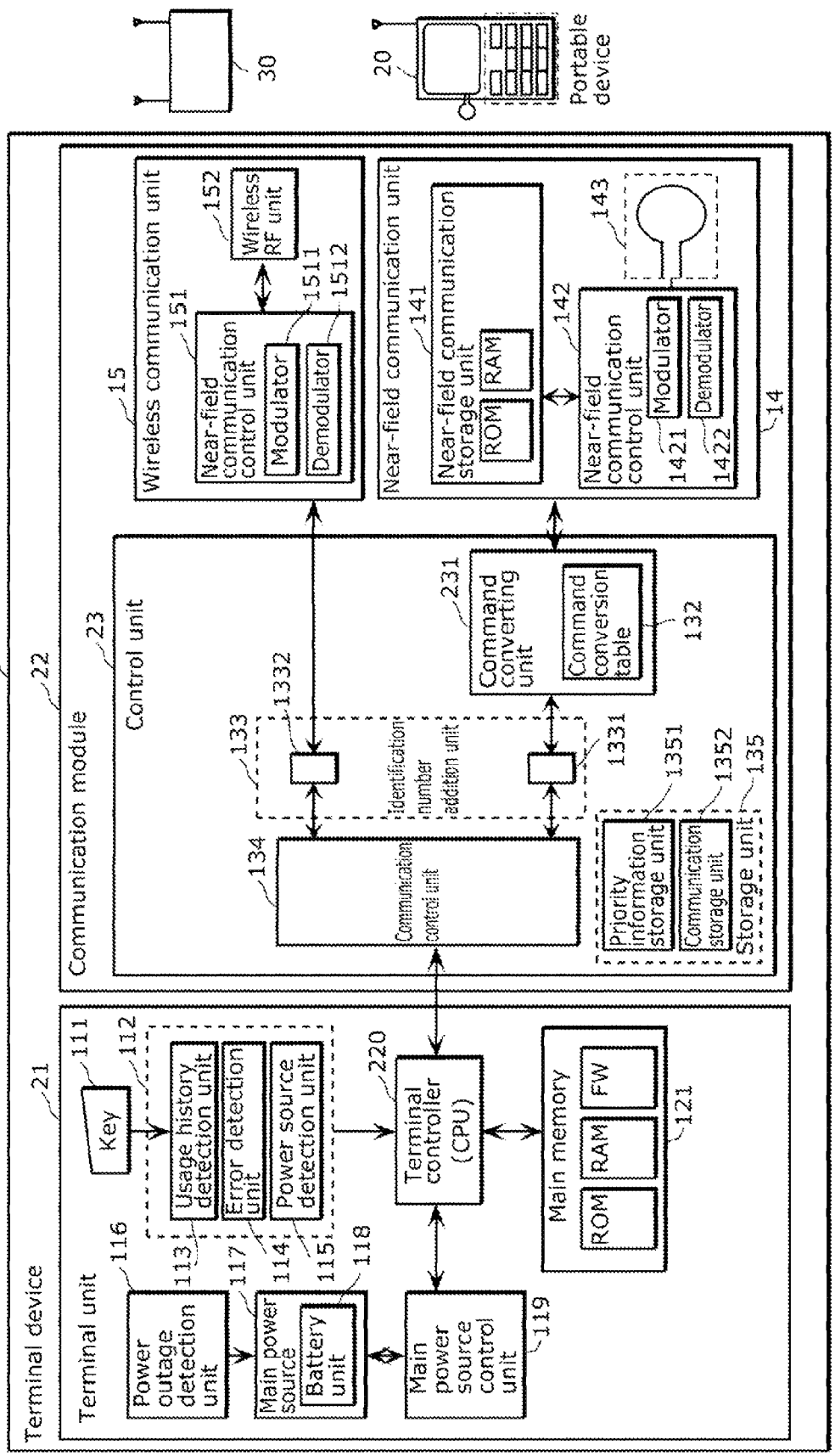
FIG. 11 is a block diagram of an example configuration of a terminal device according to a variation 1 of the embodiment 1.

FIG. 11 is a block diagram of an example configuration of a terminal device according to the variation 1 of the embodiment 1. The same reference signs will be used to refer to the same components of FIG. 2, and the description will be omitted.

The terminal device 10A shown in FIG. 11 is different from the terminal device 10 according to the embodiment 1 in the configuration of a terminal controller 220 of a terminal unit 21 and a control unit 23 of a communication module 22.

Specifically, the terminal controller 220 is different from the terminal controller 120 according to the embodiment 1 in configuration that the terminal controller 220 interprets the command scheme of only the wireless communication unit 15.

The control unit 23 is different from the control unit 13 according to the embodiment 1 in the configuration of a command converting unit 231.

The command converting unit 231 converts a command conveyed from the near-field communication unit 14 into a command corresponding to the command scheme of the wireless communication unit 15.

Figure 12:
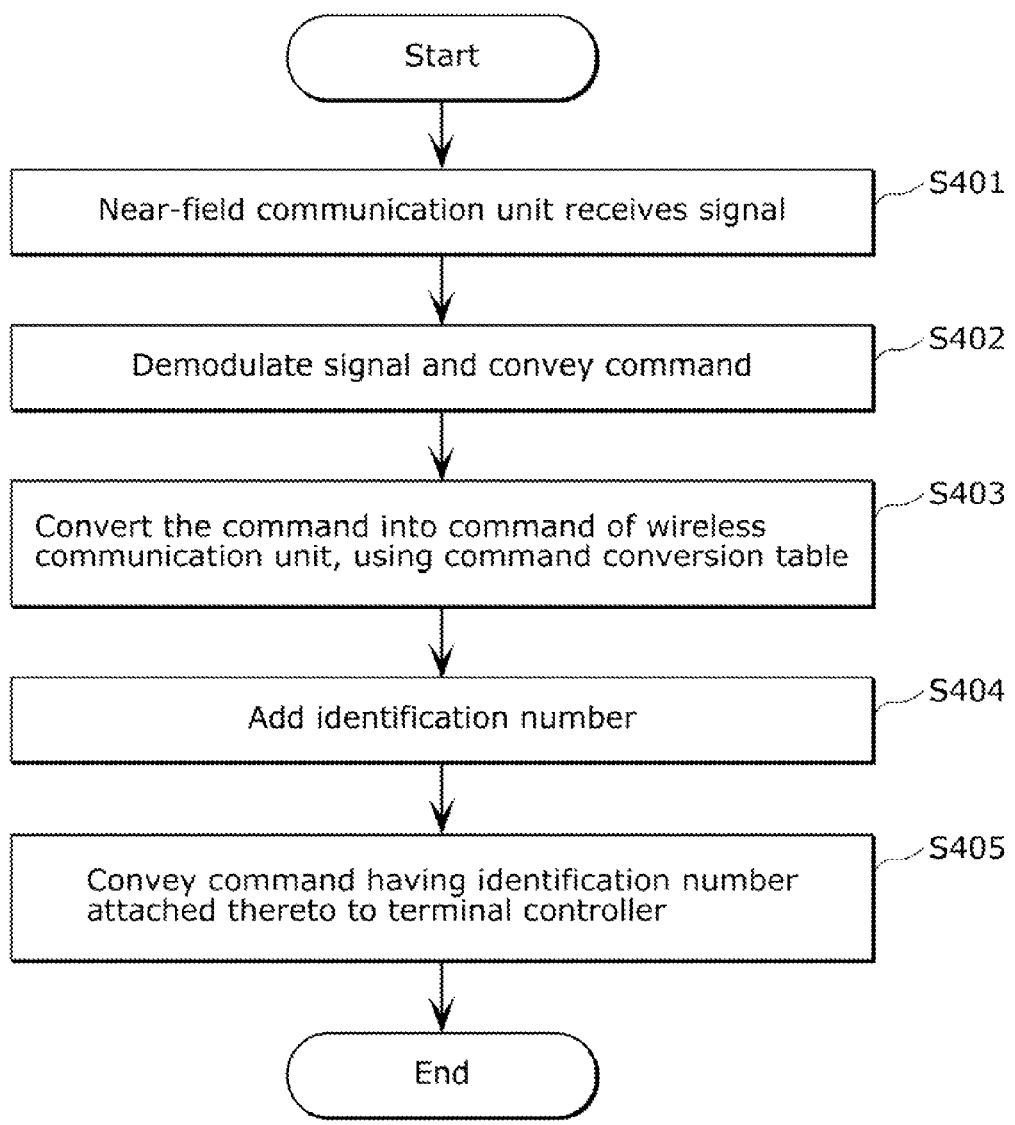
FIG. 12 is a flowchart illustrating an example of a command communication process when a command is converted by a communication module according to the variation 1 of the embodiment 1.

FIG. 12 is a flowchart illustrating an example of a command communication process in which a command is converted by the communication module according to the variation 1 of the embodiment 1.

It should be noted that the processing of S401 through S407 illustrated in FIG. 1 is the same as the processing of S101 through S107 of FIG. 6 except that the near-field communication unit 14 and the wireless communication unit 15 are exchanged. Thus, the description will not be repeated.

(Variation 2)

While in the embodiment 1, the description has been given where the identification number addition unit 133 is configured between the command converting unit 131 and the communication control unit 134, the present invention is not limited thereto. The identification number addition unit 133 may be configured between the command converting unit 131 and the wireless communication unit 15. Such a case will be described as a variation 2.

Figure 13:
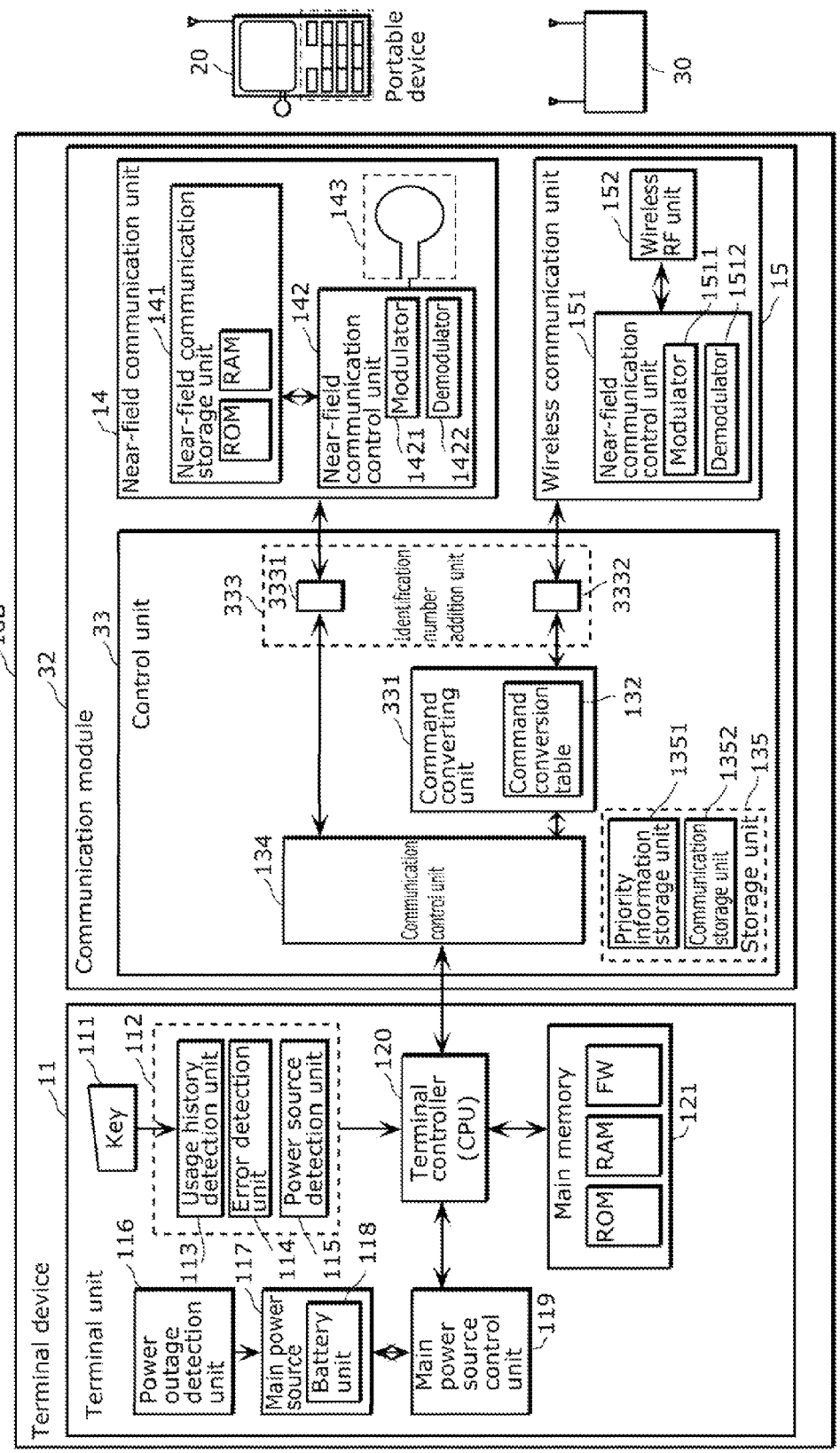
FIG. 13 is a block diagram of an example configuration of a terminal device according to a variation 2 of the embodiment 1.

FIG. 13 is a block diagram of an example configuration of a terminal device according to the variation 2 of the embodiment 1. The same reference signs will be used to refer to the same components of FIG. 2, and the description will be omitted.

A terminal device 10B shown in FIG. 13 is different from the terminal device 10 according to the embodiment 1 in the configuration of a control unit 33 of a communication module 32.

Specifically, the control unit 33 is different from the control unit 13 according to the embodiment 1 in the configuration of a command converting unit 331 and an identification number addition unit 333.

The identification number addition unit 333 is configured between the command converting unit 331 and the wireless communication unit 15. The identification number addition unit 333 adds identification numbers to commands from the near-field communication unit 14 and the wireless communication unit 15. Specifically, the identification number addition unit 333 includes a first identification number addition unit 3331 and a second identification number addition unit 3332. The first, identification number addition unit 3331 adds an identification number of the near-field communication unit 14 to an inputted command, and the second identification number addition unit 3332 adds an identification number of the wireless communication unit 15 to an inputted command.

The command converting unit 331 converts, among commands received from the wireless communication unit 15 and the near-field communication unit 14, a command which is of the other of command schemes and has the identification number added by the identification number addition unit 333, into a command of the one of the command schemes, using the command conversion table 132. Specifically, the command converting unit 331 converts a command which is conveyed from the wireless communication unit 15 and has the identification number added by the second identification number addition unit 3332, into a command corresponding to the command scheme of the near-field communication unit 14.

(Variation 3)

In the variation, a combination of the variation 1 and the variation 2 will be described.

Figure 14:
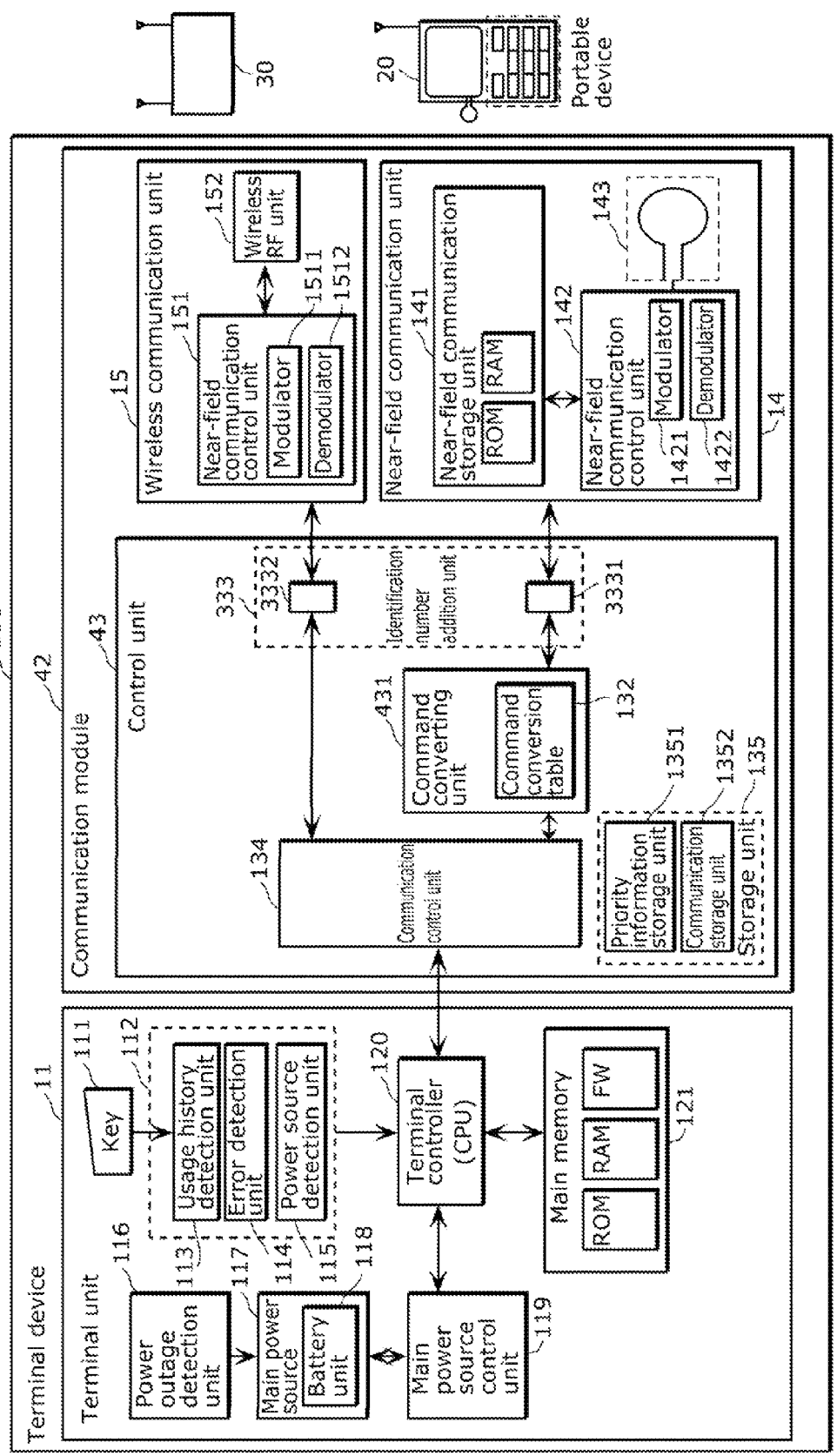
FIG. 14 is a block diagram of an example configuration of a terminal device according to a variation 3 of the embodiment 1.

FIG. 14 is a block diagram of an example configuration of a terminal device according to a variation 3 of the embodiment 1. The same reference signs will be used to refer to the same components of FIG. 2, FIG. 12, and FIG. 13, and the description will be omitted.

A terminal device 10C shown in FIG. 14 is different from the terminal device 10B according to the variation 2 in the configuration of the terminal controller 220 of the terminal unit 21 and a control unit 43 of a communication module 42.

Specifically, the terminal controller 220 is different from the terminal controller 120 according to the variation 2 in configuration that the terminal controller 220 interprets the command scheme of only the wireless communication unit 15.

The control unit 43 is different from the control unit 33 according to the variation 2 in the configuration of a command converting unit 431.

In other words, the command converting unit 431 converts a command, which is conveyed from the near-field communication unit 14 and has the identification number added by the first identification number addition unit 3331, into a command corresponding to the command scheme of the wireless communication unit 15.

As described above, according to the present embodiment, it is feasible to implement a terminal device which can properly control communications using coexisting NFC and general wireless communication without altering original functional parts of consumer electronics, and a communication method for the terminal device.

Specifically, the terminal devices according to the present embodiment include the command converting unit, thereby converting a command for accommodating the difference in communication command, so as to interpret a plurality of communication means, and transmitting a command which is interpreted by a microcomputer (the terminal controller) of a consumer electronic (the terminal device) which controls the original functions of the consumer electronic.

Moreover, the terminal devices according to the present embodiment include the identification number addition unit and the priority information storage unit, thereby exclusive controlling the wireless communication when a user of the terminal device is attempting to operate the terminal device during the wireless communication. This is because the identification number addition unit adds an identification number (ID) to a command, thereby recognizing which of the communication means has conveyed information to the microcomputer (the terminal controller) of consumer electronic and which of the communication means is to be responded to. In other words, by a command being added the identification number (ID) thereto, it can be determined that the command is transmitted from the communication means (the near-field communication unit or the wireless communication unit) using which communication scheme, the wireless communication or NFC, and ACK is to be returned to which of the near-field communication unit and the wireless communication unit.

Moreover, the terminal devices according to the present embodiment include the priority information storage unit, and the priority information based on the communications state or the operation state of a consumer electronic is stored in the priority information storage unit, thereby allowing for the control in which the communication having a higher priority level is performed. For example, such a control is possible as that, based on the priority information, the terminal device disconnects the current wireless communications with the microcomputer (the terminal controller), of consumer electronic and performs communications preferentially using the near-field communications in accordance with user operation.

Embodiment 2

An embodiment 2 includes the configurations of the embodiment 1. The embodiment 2 will give an example where a terminal device exchanges data with a portable device 20 or a server device 50, in accordance with a command.

Figure 15:
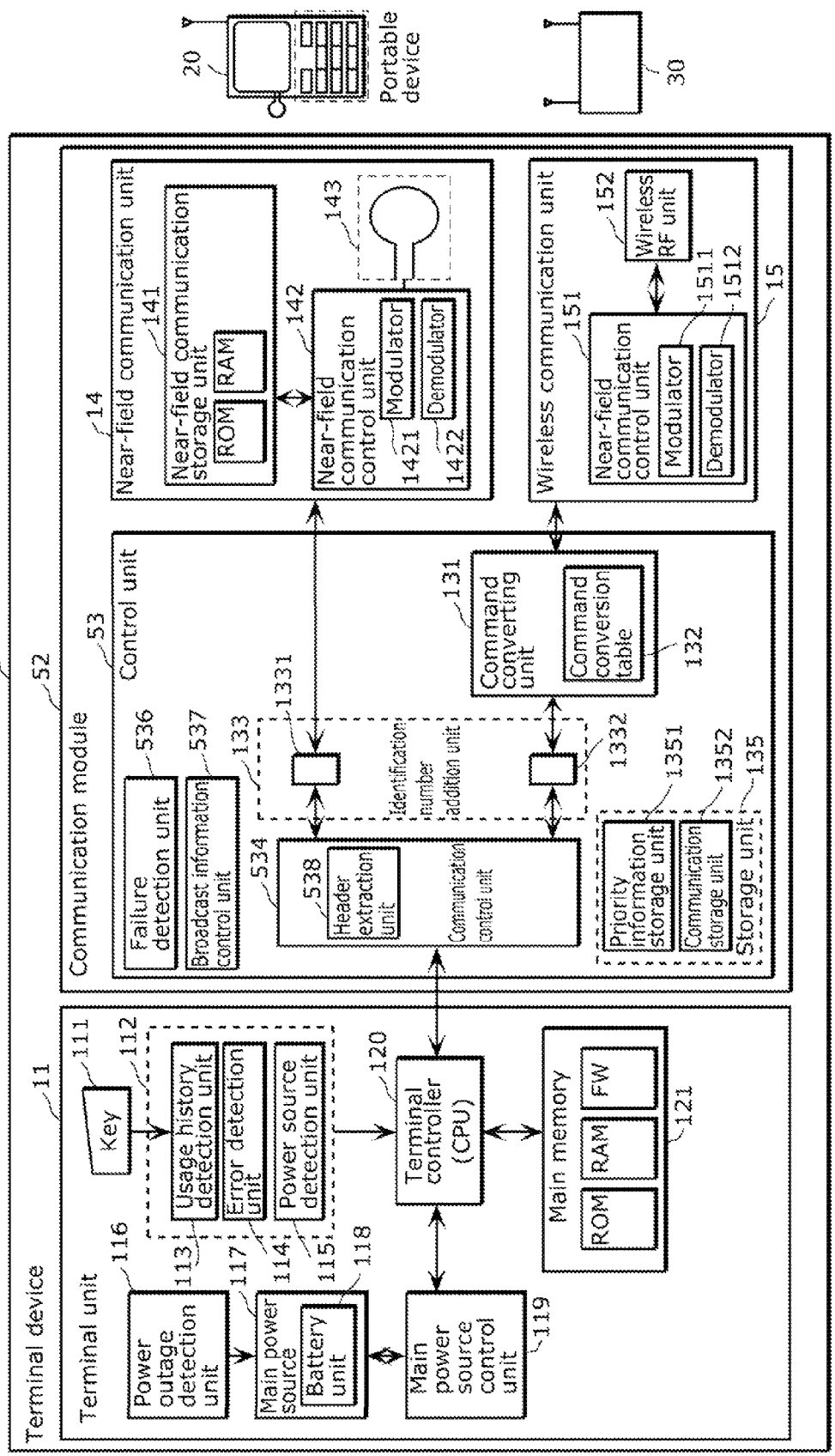
FIG. 15 is a block diagram of an example configuration of a terminal device according to an embodiment 2.

FIG. 15 is a block diagram of an example configuration of a terminal device according to the embodiment 2. The same reference signs will be used to refer to the same components of FIG. 2, and the description will be omitted.

A terminal device 10D shown in FIG. 15 is different from the terminal device 10 according to the embodiment 1 in the configuration of a control unit 53 of a communication module 52.

Specifically, the control unit 53 is different from the control unit 13 according to the embodiment 1 in the configuration of a communication control unit 534, and a failure detection unit 536 and a broadcast information control unit 537 are further included.

The communication control unit 534 is the communication control unit 134 according to the embodiment 1 that further includes a header extraction unit 538.

The header extraction unit 538 corresponds to an extraction unit according to the present invention. The header extraction unit 538 extracts a header (header information) of data stored in a main memory 121 of the terminal unit 11. The data includes the header and payload.

Specifically, the header extraction unit 538 extracts, from the header (the header information) of the data stored in the main memory 121, at least information indicating an amount of the data.

Then, the communication control unit 534 transmits the extracted header of data to the near-field communication unit 14.

Here, the control unit 53 transmits only the header of the data to the near-field communication unit 14 when the size of the data stored in the main memory 121 is larger than or equal to a predetermined size, and transmits the data when the wireless communication unit 15 is allowed to communicate with the relay device 30. It should be noted that the control unit 53 may transmit only the header of data to the near-field communication unit 14, and transmit the data when the wireless communication unit 15 is allowed to communicate with the relay device 30 (the external communication device) only if the control unit 53 receives a command, from the near-field communication unit 14, indicating that the data is to be transmitted to the wireless communication unit 15.

The other functions of the communication control unit 534 are the same as those of the communication control unit 134, and thus the description will be omitted.

The failure detection unit 536 corresponds to a failure detection unit according to the present invention. The failure detection unit 536 detects failure in at least the wireless communication unit 15 or the near-field communication unit 14.

For example, the failure detection unit 536 detects that the wireless communication unit 15 is malfunctioning, when ACK to a command is not conveyed from the wireless communication unit 15 to the control unit 53 although the control unit 53 has transmitted, to the wireless communication unit 15, the command conveyed from the terminal controller 120. Likewise, the failure detection unit 536 detects that the near-field communication unit 14 is malfunctioning, when ACK to a command is not conveyed from the near-field communication unit 14 to the control unit 53 although the control unit 53 has transmitted, to the near-field communication unit 14, the command conveyed from the terminal controller 120.

Moreover, for example, the failure detection unit 536 detects that there is an error in the network settings of the wireless communication unit 15 or there is a packet error in the wireless communications, when MAC-ACK for a data signal which includes a command is not conveyed to the wireless communication unit 15 although the wireless communication unit 15 has transmitted the data signal. When NACK is conveyed to the wireless communication unit 15, the failure detection unit 536 detects that the communications state is poor while the wireless communication unit 15 and the relay device 30 are in connection.

As described above, the failure detection unit 536 detects the failure information related to at least the wireless communication unit 15 or the near-field communication unit 14.

The broadcast information control unit 537 corresponds to a broadcast information control unit according to the present invention. The broadcast information control unit 537 detects whether broadcast information is present which is to be informed to a user of the terminal device 10D. When the broadcast information control unit 537 detects that the broadcast information is present, the broadcast information control unit 537 causes both the near-field communication unit 14 and the wireless communication unit 15 to store therein a broadcast command for allowing the user to acquire the broadcast information. When one of the wireless communication unit 15 and the near-field communication unit 14 externally communicates the broadcast command, the broadcast information control unit 537 deletes the broadcast command in the other of the wireless communication unit 15 and the near-field communication unit 14.

It should be noted that the broadcast information control unit 537 may regard the failure information detected by the failure detection unit 536 as the broadcast information. Alternatively, the broadcast information control unit 537 may detect the broadcast information from a command conveyed by the terminal controller 120. In this case, when the broadcast information control unit detects that, for example, the command is to cause the terminal controller 120 to notify information indicating an operation error of the terminal unit 11, the broadcast information control unit 537 may regard the command as the broadcast information.

Here, the broadcast information control unit 537 detects the broadcast information or the failure detection unit 536 detects the failure information, and the control unit 53 transmits the broadcast information or the failure information to the server device 50 via the near-field communication unit 14 and the wireless communication unit. The server device 50 responses a corresponding method corresponding to the near-field communication unit 14 or the wireless communication unit 15 to the failure information (the broadcast information), and the corresponding method (for example, correction information such as a normal setting value) is conveyed to the terminal unit 11.

In this manner, the correction information of the terminal device 10 is conveyed to the terminal unit 11, and thus the failure can be accommodated.

The control unit 53 is configured as described above.

Next, operation of the terminal device 10D configured as set forth above will be described.

Figure 16:
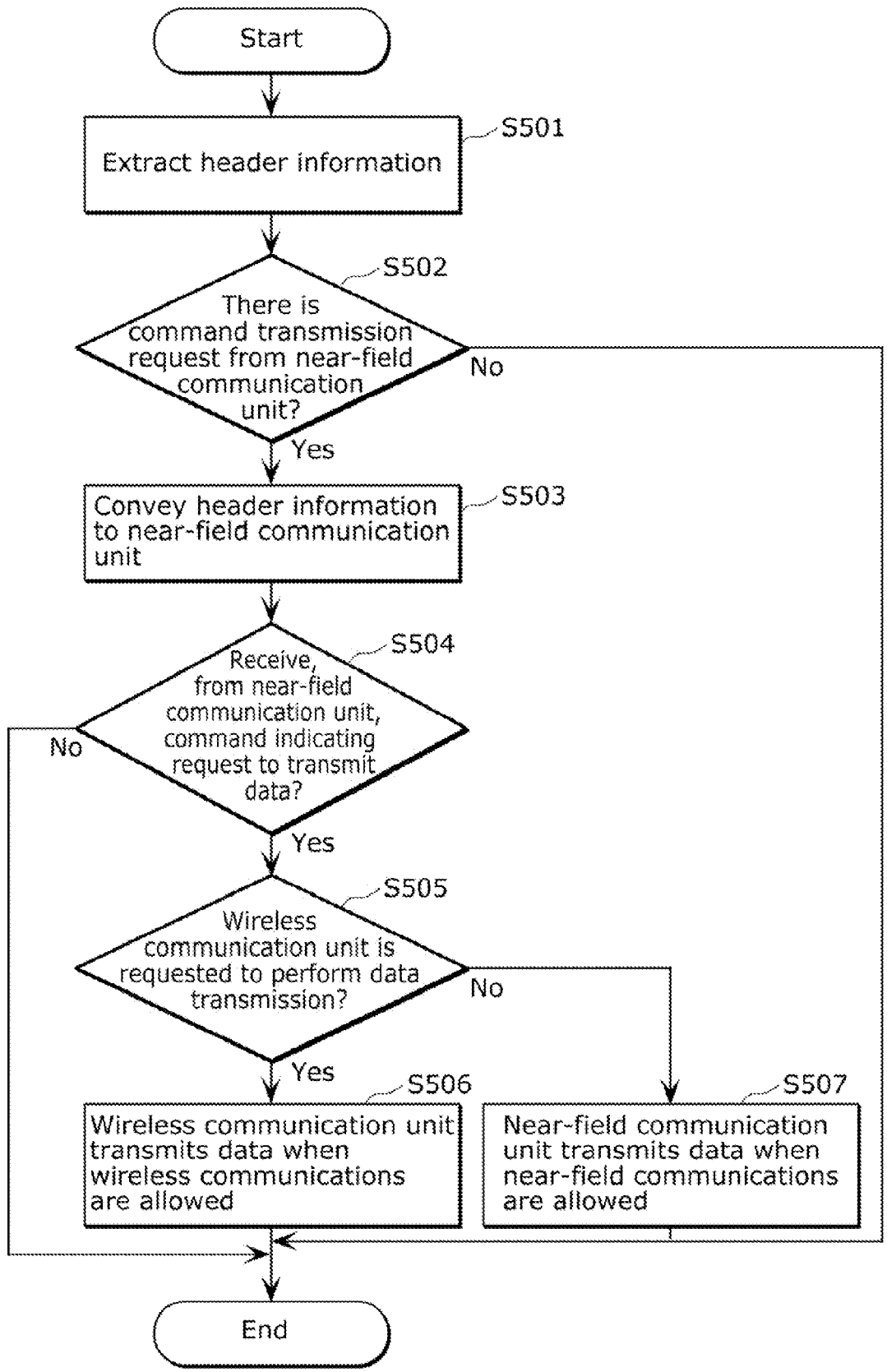
FIG. 16 is a flowchart illustrating example operation where a header is extracted by a communication module according to the embodiment 2.

FIG. 16 is a flowchart illustrating an example operation where a header is extracted by the communication module according the embodiment 2.

First, the header extraction unit 538 extracts a header (the header information) of data stored in the main memory 121 (S501). It should be noted that the header extraction unit 538 may store therein the extracted header information or store the extracted header information in the communication storage unit 1352.

Next, the communication control unit 534 checks for a command transmission request from the near-field communication unit 14 (S502).

When there is the command transmission request from the near-field communication unit 14 (Yes in S502), the communication control unit 534 conveys the extracted header information to the near-field communication unit 14 (S503). When there is no command transmission request from the near-field communication unit 14 (No in S502), the communication control unit 534 ends the operation illustrated in FIG. 16.

Next, the communication control unit 534 checks if the communication control unit 534 has received, from the near-field communication unit 14, a command indicating a request to transmit the data stored in the main memory 121 (S504). When the communication control unit 534 does not receive, from the near-field communication unit 14, the command indicating the request to transmit the data stored in the main memory 121 (No in S504), the communication control unit 534 ends the operation illustrated in FIG. 16.

When the communication control unit 534 has received, from the near-field communication unit 14, the request to transmit the data stored in the main memory 121 (Yes in S504), the communication control unit 534 checks if the command is requesting the wireless communication unit 15 to perform data transmission (S505).

When the command is requesting the wireless communication unit 15 to perform the data transmission (Yes in S505), the communication control unit 534 temporarily stores the data stored in the main memory 121 into the communication storage unit 1352, and transmits the data when the wireless communication unit 15 is allowed to communicate with the relay device 30 (the external communication device) (S506).

On the other hand, when the command is requesting the near-field communication unit 14 to perform data transmission (No in S505), the communication control unit 534 transmits the data stored in the main memory 121 to the near-field communication unit 14 (S507). In that case, the near-field communication unit 14 temporarily stores (records) the received data in the near-field communication storage unit 141, and transmits the data when the near-field communication unit 14 is allowed to communicate with the portable device 20.

Figure 17:
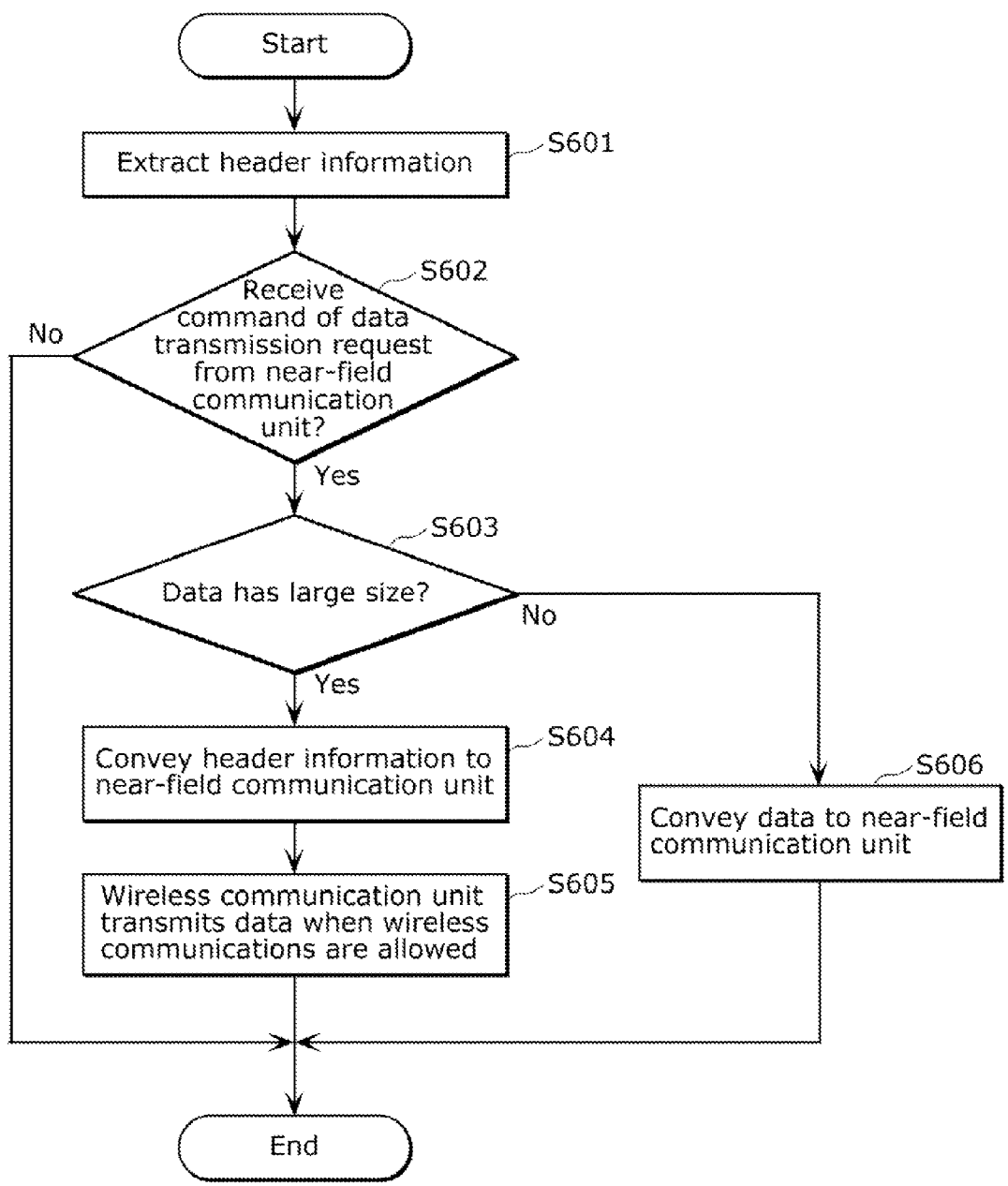
FIG. 17 is a flowchart illustrating another example operation where the header is extracted by the communication module according to the embodiment 2.

FIG. 17 is a flowchart illustrating another example operation where the header is extracted by the communication module according to the embodiment 2.

First, the header extraction unit 538 extracts the header (the header information) of the data stored in the main memory 121 (S601). The header extraction unit 538 may store therein the extracted header information or store the extracted header information in the communication storage unit 1352.

Next, the communication control unit 534 checks if the communication control unit 534 has received the command of the data transmission request from the near-field communication unit 14 (S602).

When the communication control unit 534 has received the command of the data transmission request from the near-field communication unit 14 (Yes in S602), the communication control unit 534 further checks the extracted header information as to whether the size of the data stored in the main memory 121 is larger than or equal to a predetermined size (S603). When the communication control unit 534 does not receive the command of the data transmission request from the near-field communication unit 14 (No in S602), the communication control unit 534 ends the operation illustrated in FIG. 17.

When the size of the data stored in the main memory 121 is larger than or equal to the predetermined size (Yes in S603), the communication control unit 534 conveys the extracted header information to the near-field communication unit 14 (S604). Together, the communication control unit 534 temporarily stores the data stored in the main memory 121 into the communication storage unit 1352.

Next, the communication control unit 534 transmits the data when the wireless communication unit 15 is allowed to communicate with the relay device 30 (an external communication device) (S605).

On the other hand, when the size of the data stored in the main memory 121 is smaller than the predetermined size (No in S603), the communication control unit 534 transmits the data stored in the main memory 121 to the near-field communication unit 14 (S606). In that case, the near-field communication unit 14 temporarily stores (records) the received data in the near-field communication storage unit 141, and transmits the data when the near-field communication unit 14 is allowed to communicate with the portable device 20.

Figure 18:
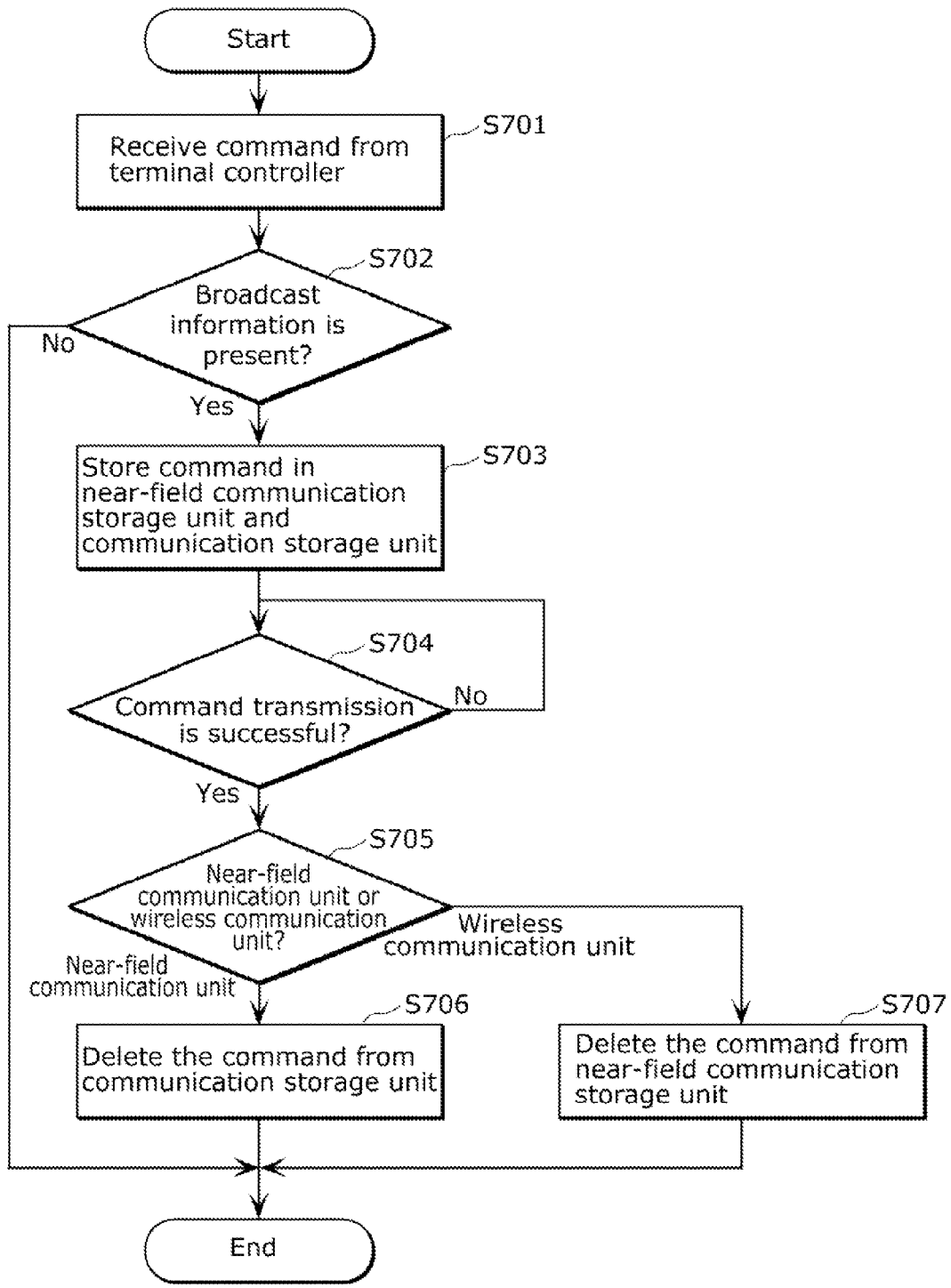
FIG. 18 is a flowchart illustrating an example where broadcast information is communicated by the communication module according to the embodiment 2.

FIG. 18 is a flowchart illustrating an example where the broadcast information is communicated by the communication module according to the embodiment 2.

First, the communication control unit 534 receives a command from the terminal controller 120 (S701).

Next, the broadcast information control unit 537 checks for the broadcast information from the command conveyed from the terminal controller 120 (S702).

When the broadcast information control unit 537 detects broadcast information from the command conveyed from the terminal controller 120 (Yes in S702), the broadcast information control unit 537 causes both the near-field communication unit 14 and the wireless communication unit 15 to hold (store) the broadcast command for allowing the user to acquire the broadcast information (S703).

Next, the broadcast information control unit 537, after a period of time, checks if the wireless communication unit 15 or the near-field communication unit 14 has succeeded in externally communicating the broadcast command (S704).

Here, when the wireless communication unit 15 or the near-field communication unit 14 has succeeded in externally communicating the broadcast command (Yes in S704), the broadcast information control unit 537 checks which of the wireless communication unit 15 and the near-field communication unit 14 has externally communicated the broadcast command (S705).

When the broadcast information control unit 537 has checked that the near-field communication unit 14 had externally communicated the broadcast command, the broadcast information control unit 537 deletes the broadcast command of the wireless communication unit 15 from the communication storage unit 1352 (S706).

On the other hand, when the broadcast information control unit 537 has checked that the wireless communication unit 15 had externally communicated the broadcast command, the broadcast information control unit 537 causes the near-field communication unit 14 to delete the broadcast command.

In this manner, the communication module 52 communicates the broadcast information.

While in the above, the example is given where the broadcast information is determined from the command of the terminal controller 120, the present invention is not limited thereto. For example, the failure information detected by the failure detection unit 536 may be determined as the broadcast information. In other words, the determination method is not limited and may be any insofar as the method can determine the broadcast information to be informed to the user of the terminal device 10D.

Figure 19:
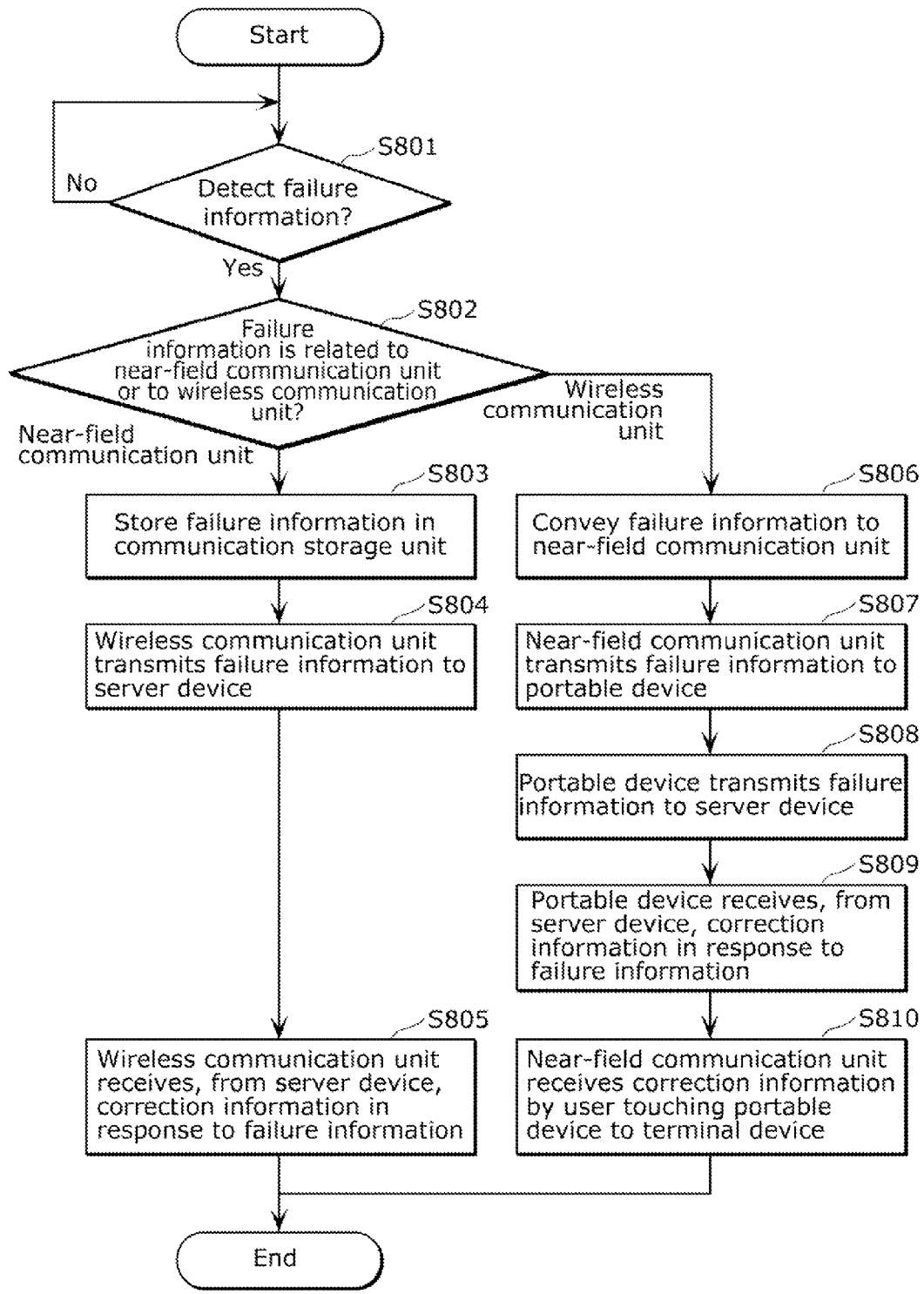
FIG. 19 is a flowchart illustrating an example where the failure information is communicated by the communication module according to the embodiment 2.

FIG. 19 is a flowchart illustrating an example where the failure information is communicated by the communication module according to the embodiment 2.

First, the failure detection unit 536 attempts whether the failure detection unit 536 can detect the failure information (S801). If the failure detection unit 536 cannot detect the failure information (No in S801), the processing returns to S801, and after a period of time, the failure detection unit 536 again attempts whether the failure detection unit 536 can detect the failure information.

When the failure detection unit 536 detects the failure information (Yes in S801), the failure detection unit 536 further checks if the failure information is related to the near-field communication unit 14 or to the wireless communication unit 15 (S802).

When the failure information detected by the failure detection unit 536 is related to the near-field communication unit 14, the failure detection unit 536 stores the failure information in the communication storage unit 1352 (S803), and causes the wireless communication unit 15 to transmit the failure information to the server device 50 via the relay device 30 (S804).

Next, the wireless communication unit 15 receives, from the server device 50, the correction information in response to the failure information (S805). In this manner, the correction information is conveyed to the terminal device 10, and thus the failure can be accommodated.

On the other hand, when the failure information detected by the failure detection unit 536 is related to the wireless communication unit 15 in S802, the failure detection unit 536 conveys the failure information to the near-field communication unit 14 (S806).

Next, the near-field communication unit 14 transmits the failure information to the portable device 20 (S807).

Next, the portable device 20 transmits the failure information to the server device 50 (S808).

Next, the portable device 20 receives, from the server device 50, the correction information in response to the failure information (S809). Then, the user places the portable device 20 close to the terminal device 10 for the near-field communications, and thus the near-field communication unit 14 receives, from the server device 50, the correction information in response to the failure information (S810). In this manner, the correction information is conveyed to the terminal device 10, and thus the failure can be accommodated. In other words, there are advantageous effects that the user can correct the failure by simplified operation of placing the portable device or the like to the terminal device based on the failure information, without directly operating the terminal device 10 to correct to the failure.

The relay device 30 may also have the near-field communication capability. In that case, there are advantageous effects that, even if there is failure due to effects of the relay device 30, or failure due to effects of both the terminal device 10 and the relay device 30, the user conveys to the relay device 30 the correction information stored in the portable device 20 by placing the portable device 20 closer to the relay device 30 in the same manner as the above, thereby correcting the failure of the relay device 30.

As described above, the communication module 52 communicates the failure information.

As described above, according to the present invention, it is feasible to implement a terminal device which can properly control communications using coexisting NFC and general wireless communication without altering original functional parts of consumer electronics, and a communication method for the terminal device.

While the terminal device according to the present invention and the communication method for the same have been described with reference to the embodiments, the present invention is not limited to the embodiments. Various modifications to the present embodiments that may be conceived by those skilled in the art and other embodiments constructed by combining constituent elements in different embodiments are included in the scope of the present invention, without departing from the essence of the present invention.

Figure 20:
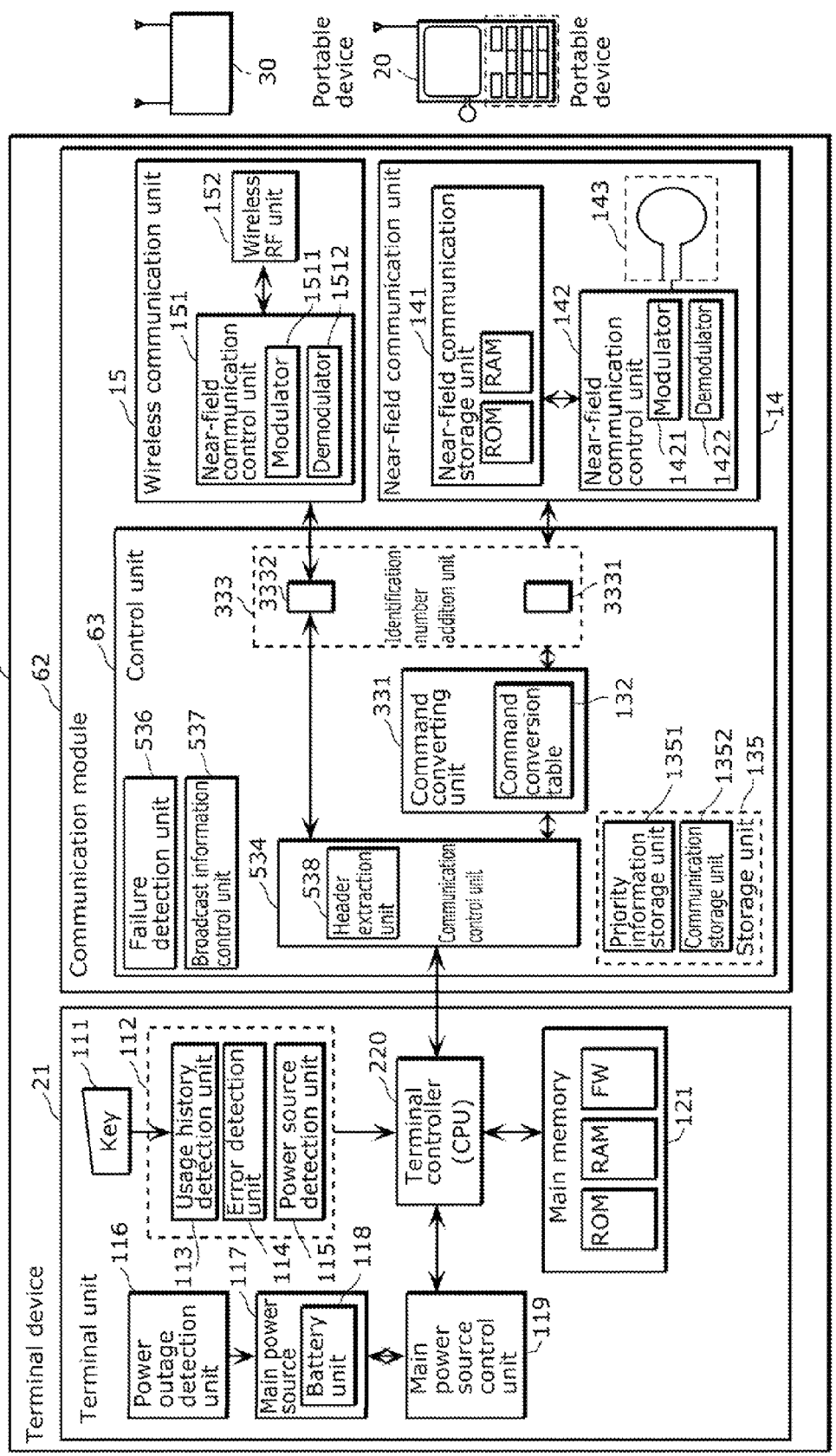
FIG. 20 is a block diagram of an example configuration of a terminal device according to a variation of the embodiment 2.

For example, while in the embodiment 2, the identification number addition unit 133 is configured between the command converting unit 131 and the communication control unit 534, the present invention is not limited thereto. The identification number addition unit may be configured between the command converting unit and the wireless communication unit 15. Moreover, while in the embodiment 2, the description has been given that the command scheme interpreted by the terminal controller 120 which controls the terminal unit 11 is the command scheme of only the near-field communication unit 14, the present invention is not limited thereto. The command scheme which is interpreted by the terminal controller 120 may be the command scheme of only the wireless communication unit 15. As shown in FIG. 20, as in the variation 2 of the embodiment 1, an identification number addition unit 633 may be configured between a command converting unit 631 and the wireless communication unit 15.

Here, FIG. 20 is a block diagram of a configuration example of a terminal device according to a variation of the embodiment 2. The same reference signs will be used to refer to the same components of FIG. 12, FIG. 13, FIG. 15, and the description will be omitted. It should be noted that a terminal device 10E shown in FIG. 20 is different from the terminal device 10D according to the embodiment 2 in the configuration of the terminal controller 220 of the terminal unit 21 and a control unit 63 of a communication module 62.

While in the embodiments 1 and 2, the example has been given where the communications between the terminal device 10 and the portable device 20 are performed using the near-field communications such as the NFC, the present invention is not limited thereto. The communications for transmission and reception of the command information may be performed using infrared communications, and the portable device 20 may be a remote controller of an air conditioner or the like.

Moreover, solely the communication module which is mounted on the terminal device is also within the scope of the present invention. This is because, for a terminal device that includes a communication module which includes only the wireless communication unit or the near-field communication unit, by replacing the existing communication module by the communication module according to the present invention, advantageous effects of the present invention can be obtained which can properly control communications using coexisting NFC and general wireless communication without altering original functional parts of consumer electronics, and a communication method for the terminal device.

Specifically, the communication module according to one aspect of the present invention includes a near-field communication unit configured to perform near-field communications with an external reader/writer; a wireless communication unit configured to perform wireless communications with an external communication device; a terminal control unit configured to interpret only one of command schemes of the wireless communication unit and the near-field communication unit, and control a function of the terminal device; and a unit-to-unit communication control unit configured to control communications between the wireless communication unit and the near-field communication unit, the unit-to-unit communication control unit including: an identification number addition unit configured to add an identification number to one of commands from the near-field communication unit and the wireless communication unit; and a command converting unit configured to convert a command of the other of the command schemes among the commands from the wireless communication unit and the near-field communication unit into a command of the one of the command schemes, using a command conversion table in which the command scheme of the wireless communication unit and the command scheme of the near-field communication unit are associated.

Moreover, the present invention may be implemented in not only a device but also part of processing means included in such a device may be implemented as an integrated circuit.

Specifically, the integrated circuit according to one aspect of the present invention is an integrated circuit for controlling communications between a terminal control unit and a near-field communication unit and between the terminal control unit and a wireless communication unit, the terminal control unit being configured to interpret only one of command schemes of the wireless communication unit and the near-field communication unit, and control a function of the terminal device, the wireless communication unit being configured to perform wireless communications with an external communication device, the near-field communication unit being configured to perform near-field communications with an external reader/writer, and the unit-to-unit communication control unit including: an identification number addition unit configured to add an identification number to one of commands from the near-field communication unit and the wireless communication unit; and a command converting unit configured to convert a command of the other of the command schemes among the commands from the wireless communication unit and the near-field communication unit into a command of the one of the command schemes, using a command conversion table in which the command scheme of the wireless communication unit and the command scheme of the near-field communication unit are associated.

Moreover, the present invention may be implemented as, for example, a method including steps performed by processing units included in the device and a program for causing a computer to execute such steps.

In other words, as one aspect of the present invention, the present invention may be implemented in a program for causing a terminal device including: a near-field communication unit for performing near-field communications with an external reader/writer; a wireless communication unit for performing wireless communications with an external communication device; a terminal control unit for interpreting only one of command schemes of the wireless communication unit and the near-field communication unit, and controlling a function of the terminal device; and a unit-to-unit communication control unit for controlling communications between the wireless communication unit and the terminal control unit and between the near-field communication unit and the terminal control unit, to execute: causing the unit-to-unit communication control unit to add an identification number to one of commands from the near-field communication unit and the wireless communication unit; and causing the unit-to-unit communication control unit to convert a command of the other of the command schemes among the commands from the wireless communication unit and the near-field communication unit into a command of the one of the command schemes, using a command conversion table in which the command scheme of the wireless communication unit and the command scheme of the near-field communication unit are associated. Also, as one aspect of the present invention, the present invention may be implemented in a communication method executed by the terminal device including: a near-field communication unit for performing near-field communications with an external reader/writer; a wireless communication unit for performing wireless communications with an external communication device; a terminal control unit for interpreting only one of command schemes of the wireless communication unit and the near-field communication unit, and controlling a function of the terminal device; and a unit-to-unit communication control unit for controlling communications between the wireless communication unit and the terminal control unit and between the near-field communication unit and the terminal control unit, the communication method including: causing the unit-to-unit communication control unit to add an identification number to one of commands from the near-field communication unit and the wireless communication unit, and causing the unit-to-unit communication control unit to convert a command of the other of the command schemes among the commands from the wireless communication unit and the near-field communication unit into a command of the one of the command schemes, using a command conversion table in which the command scheme of the wireless communication unit and the command scheme of the near-field communication unit are associated.

INDUSTRIAL APPLICABILITY

The present invention is applicable to terminal devices, communication methods for the terminal devices, and communication modules, and, in particular, to electronic device terminals such as audiovisual consumer electronics, consumer electronics such as white goods like refrigerators.

REFERENCE SIGNS LIST

1 System
10, 10A, 10B, 10C, 100, 10E Terminal device
11, 21 terminal unit
12, 22, 32, 42, 52, 62 Communication module
13, 23, 33, 43, 53, 63 Control unit
14 Near-field communication unit
15 Wireless communication unit
20 Portable device
30 Relay device
40 Network
50 Server device
111 Key
112 Detection unit
113 Usage history detection unit
114 Error detection unit
115 Power source detection unit
116 Power outage detection unit
117 Main power source
118 Battery unit
119 Main power source control unit
120, 220 Terminal controller
121 Main memory
131, 231, 331, 431, 631 Command converting unit
132 Command conversion table
133, 333, 633 Identification number addition unit
134, 534 Communication control unit
135 Storage unit
141 Near-field communication storage unit
142 Near-field communication control unit
143 Antenna
151 Wireless communication control unit
152 Wireless RF unit
536 Failure detection unit
537 Broadcast information control unit
538 Header extraction unit
1331, 3331 First identification number addition unit
1332, 3332 Second identification number addition unit
1351 Priority information storage unit
1352 Communication storage unit
1421, 1511 Modulator
1422, 1512 Demodulator

The invention claimed is:

1. A terminal device comprising:
a processor;
a near-field communication unit configured to perform near-field communications with an external reader/writer;
a wireless communication unit configured to perform wireless communications with an external communication device;
a terminal control unit configured to interpret only one of command schemes of the wireless communication unit and the near-field communication unit, and control a function of the terminal device; and
a unit-to-unit communication control unit configured to control communications between the wireless communication unit and the terminal control unit and between the near-field communication unit and the terminal control unit, the unit-to-unit communication control unit including:
an identification number addition unit configured to add an identification number to one of commands from the near-field communication unit and the wireless communication unit;
a command converting unit configured to convert a command of the other of the command schemes among the commands from the wireless communication unit and the near-field communication unit into a command of the one of the command schemes, using a command conversion table in which the command scheme of the wireless communication unit and the command scheme of the near-field communication unit are associated; and
an extraction unit configured to extract a header of data stored in a storage unit of the terminal device,
wherein the unit-to-unit communication control unit is configured to communicate, to the terminal control unit, the command of the other of the command schemes which has the identification number added by the identification number addition unit, or the command of the one of the command schemes which has the identification number added by the identification number addition unit, the command of the other of the command schemes being converted into a command of the one of the command schemes, and the unit-to-unit communication control unit is configured to transmit the header of the data to the near-field communication unit when a size of the data is larger than or equal to a predetermined size, and transmit the data when the wireless communication unit is allowed to communicate with the external communication device.

2. The terminal device according to claim 1,
wherein the unit-to-unit communication control unit further includes a communication control unit configured to transmit a response command received from the terminal control unit as a response to the command communicated to the terminal control unit, to the near-field communication unit or the wireless communication unit, based on the identification number added to the command included in the response command.

3. The terminal device according to claim 1,
wherein using the command conversion table, the command converting unit is configured to convert, among the commands received from the wireless communication unit and the near-field communication unit, the command of the other of the command schemes which has the identification number added by the identification number addition unit into a command of the one of the command schemes.

4. The terminal device according to claim 1,
wherein the identification number addition unit is configured to add the identification number to the command obtained by the command converting unit converting the command of the other of the command schemes.

5. The terminal device according to claim 1,
wherein the unit-to-unit communication control unit is serially connected to the terminal control unit.

6. The terminal device according to claim 5,
wherein the communication control unit is further configured to serially communicate, to the terminal control unit, a command of the other of the command schemes which has been converted into a command of the one of the command schemes and has the identification number added by the identification number addition unit, or a command of the one of the command schemes which has the identification number added by the identification number addition unit.

7. The terminal device according to claim 1,
wherein the unit-to-unit communication control unit further includes a priority information storage unit configured to store priority information indicating which of the near-field communication unit and the wireless communication unit is given priority for communication, and based on the priority information, the communication control unit is configured to block command communications between the terminal control unit and one of the near-field communication unit and the wireless communication unit, and perform the command communications between the terminal control unit and the other of the near-field communication unit and the wireless communication unit.

8. The terminal device according to claim 7,
wherein the priority information includes information indicating that the command communications between the near-field communication unit and the terminal control unit are given the priority over the command communications between the wireless communication unit and the terminal control unit.

9. The terminal device according to claim 7,
wherein the priority information includes information indicating a priority command which is a command to be preferentially communicated, and when the communication control unit receives the priority command from one of the near-field communication unit and the wireless communication unit, the communication control unit is configured to block the command communications between the terminal control unit and the other of the near-field communication unit and the wireless communication unit, and perform the command communications between the terminal control unit and the one of the near-field communication unit and the wireless communication unit.

10. The terminal device according to claim 1,
wherein when the unit-to-unit communication control unit receives from the near-field communication unit a command indicating that the data is to be transmitted to the wireless communication unit, the unit-to-unit communication control unit is configured to transmit the data when the wireless communication unit is allowed to communicate with the external communication device.

11. The terminal device according to claim 1,
wherein the unit-to-unit communication control unit includes a broadcast information control unit configured to detect whether broadcast information is present which is to be informed to a user of the terminal device, and broadcast information control unit is configured to cause both the near-field communication unit and the wireless communication unit to store a broadcast command for allowing the user to acquire the broadcast information when the broadcast information control unit has detected that the broadcast information is present, and when one of the wireless communication unit and the near-field communication unit has communicated the broadcast command, the broadcast information control unit is configured to cause the other of the wireless communication unit and the near-field communication unit to delete the broadcast command stored in the other of the wireless communication unit and the near-field communication unit.

12. The terminal device according to claim 11,
wherein the terminal device further includes a failure detection unit configured to detect failure of the wireless communication unit or the near-field communication unit, and the broadcast information indicates the failure detected by the failure detection unit.

13. A communication method executed by a terminal device, the terminal device including:
a processor;
a near-field communication unit for performing near-field communications with an external reader/writer;
a wireless communication unit for performing wireless communications with an external communication device;
a terminal control unit for interpreting only one of command schemes of the wireless communication unit and the near-field communication unit, and controlling a function of the terminal device; and
a unit-to-unit communication control unit for controlling communications between the wireless communication unit and the terminal control unit and between the near-field communication unit and the terminal control unit, the communication method comprising:
(a) causing the unit-to-unit communication control unit to add an identification number to one of commands from the near-field communication unit and the wireless communication unit;
(b) causing the unit-to-unit communication control unit to convert a command of the other of the command schemes among the commands from the wireless communication unit and the near-field communication unit into a command of the one of the command schemes, using a command conversion table in which the command scheme of the wireless communication unit and the command scheme of the near-field communication unit are associated;
(c) causing the unit-to-unit communication control unit to extract a header of data stored in a storage unit of the terminal device,
wherein the command of the other of the command schemes which has the identification number added in step (a), or the command of the one of the command schemes which has the identification number added in step (a) is communicated to the terminal control unit, the command of the other of the command schemes being converted into a command of the one of the command schemes in step (b); and
(d) causing the unit-to-unit communication control unit to transmit the header of the data to the near-field communication unit when a size of the data is larger than or equal to a predetermined size, and to transmit the data when the wireless communication unit is allowed to communicate with the external communication device.

14. A non-transitory computer-readable recording medium having stored therein a program executed by a terminal device including:
a near-field communication unit for performing near-field communications with an external reader/writer;
a wireless communication unit for performing wireless communications with an external communication device;
a terminal control unit for interpreting only one of command schemes of the wireless communication unit and the near-field communication unit, and controlling a function of the terminal device; and
a unit-to-unit communication control unit for controlling communications between the wireless communication unit and the terminal control unit and between the near-field communication unit and the terminal control unit,
the program for:
(a) causing the unit-to-unit communication control unit to add an identification number to one of commands from the near-field communication unit and the wireless communication unit; and
(b) causing the unit-to-unit communication control unit to convert a command of the other of the command schemes among the commands from the wireless communication unit and the near-field communication unit into a command of the one of the command schemes, using a command conversion table in which the command scheme of the wireless communication unit and the command scheme of the near-field communication unit are associated;
(c) causing the unit-to-unit communication control unit to extract a header of data stored in a storage unit of the terminal device,
wherein the command of the other of the command schemes which has the identification number added in step (a), or the command of the one of the command schemes which has the identification number added in step (a) is communicated to the terminal control unit, the command of the other of the command schemes being converted into a command of the one of the command schemes in step (b); and
(d) causing the unit-to-unit communication control unit to transmit the header of the data to the near-field communication unit when a size of the data is larger than or equal to a predetermined size, and to transmit the data when the wireless communication unit is allowed to communicate with the external communication device.

* * * * *